United States Patent [19]

Tsutsumi et al.

[11] Patent Number: 5,216,663
[45] Date of Patent: Jun. 1, 1993

[54] MAGNETO-OPTIC RECORDING MEDIUM AND MANUFACTURING METHOD

[75] Inventors: Kazuhiko Tsutsumi; Tatsuya Fukami; Motohisa Taguchi; Yoshiyuki Nakaki; Takashi Tokunaga, all of Amagasaki, Japan

[73] Assignee: Mitsubishi Denki Kabushiki Kaisha, Japan

[21] Appl. No.: 474,104

[22] PCT Filed: Aug. 23, 1989

[86] PCT No.: PCT/JP89/00863

§ 371 Date: Apr. 20, 1990

§ 102(e) Date: Apr. 20, 1990

[87] PCT Pub. No.: WO90/02400

PCT Pub. Date: Mar. 8, 1990

[30] Foreign Application Priority Data

| Aug. 24, 1988 | [JP] | Japan | 61-210205 |
| May 12, 1989 | [JP] | Japan | 63-119244 |
| Jun. 15, 1989 | [JP] | Japan | 63-154918 |
| Jul. 10, 1989 | [JP] | Japan | 63-175591 |

[51] Int. Cl.$^5$ ............................................. G11B 3/70
[52] U.S. Cl. ............................................. 369/275.2
[58] Field of Search ............ 369/13, 275.1, 275.2, 369/275.3, 283, 284, 286, 288

[56] References Cited

U.S. PATENT DOCUMENTS

| 4,649,519 | 3/1987 | Sun et al. | 365/122 |
| 4,878,132 | 10/1989 | Aratani et al. | 360/59 |
| 4,908,809 | 3/1990 | Tadokoro et al. | 360/131 |
| 5,025,430 | 6/1991 | Tadokoro et al. | 360/59 |

FOREIGN PATENT DOCUMENTS

| 0217-96 | 4/1987 | European Pat. Off. | |
| 0257530 | 3/1988 | European Pat. Off. | |
| 258978 | 3/1988 | European Pat. Off. | |
| 285241 | 10/1988 | European Pat. Off. | |
| 288069 | 10/1988 | European Pat. Off. | |
| 319004 | 6/1989 | European Pat. Off. | |
| 352548 | 1/1990 | European Pat. Off. | |
| 61-71436 | 4/1986 | Japan | 369/13 |
| 62-175948 | 8/1987 | Japan | |
| 63-205835 | 8/1988 | Japan | |
| 63-237238 | 10/1988 | Japan | |
| 63-304448 | 12/1988 | Japan | |
| 64-76549 | 3/1989 | Japan | |
| 1-113940 | 5/1989 | Japan | |

Primary Examiner—Eugene R. LaRoche
Assistant Examiner—Tan Nguyen
Attorney, Agent, or Firm—Wolf, Greenfield & Sacks

[57] ABSTRACT

This invention relates to a multi-layer magneto-optic recording medium having an information recording layer and an initializing layer that can be overwritten by light modulation, and in which adjacent layers, including auxiliary layers provided for more efficient transfer from the initializing layer to the recording layer, are coupled by an exchange force. This structure enables high-density, high-speed recording of audio information, visual information, and computer data.

1 Claim, 100 Drawing Sheets

FIG. 1(a)
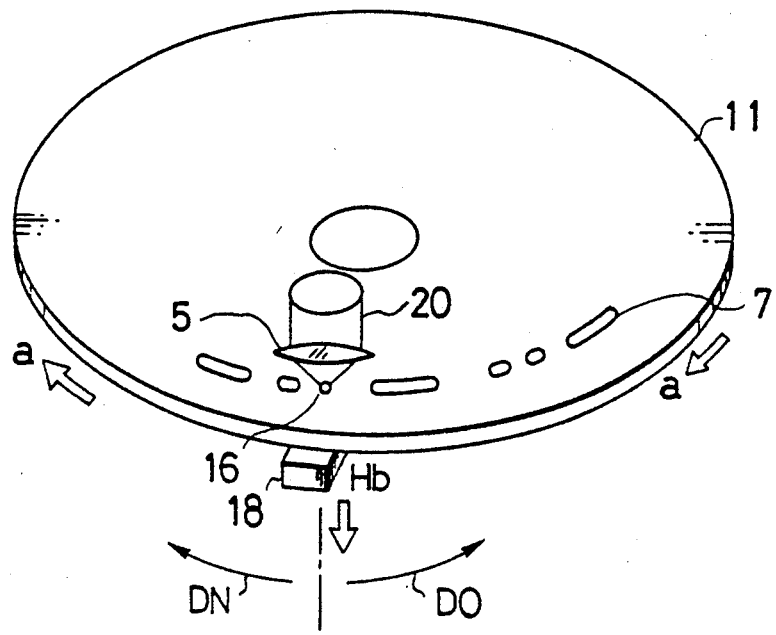
FIG. 1(b)
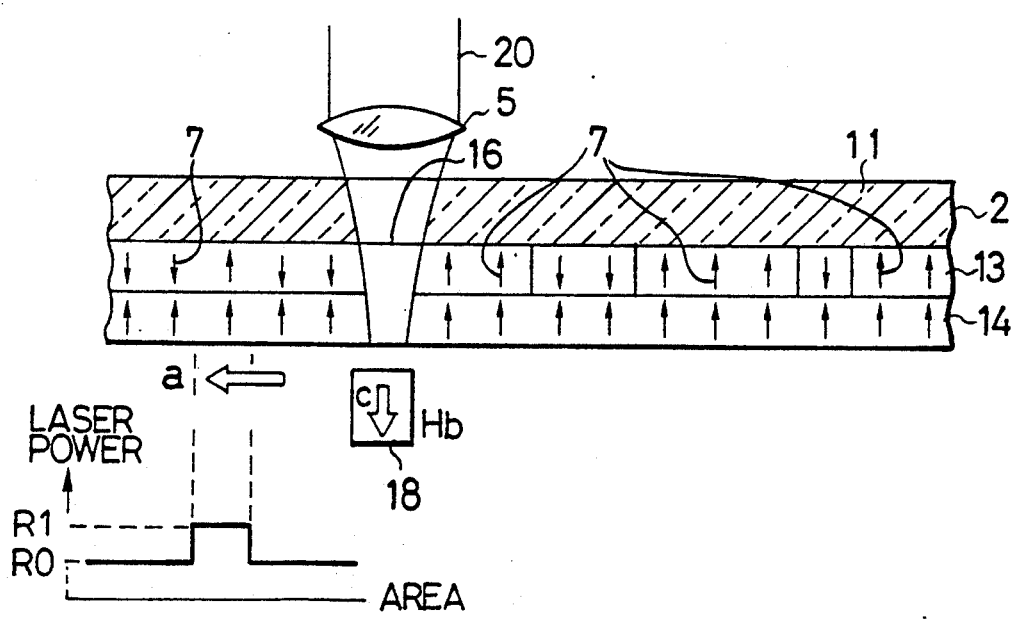
FIG. 1(c)

FIG. 4
(1) ROOM TEMP.
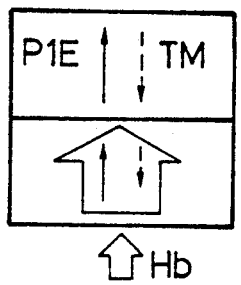
(2) $Tc2 > Tr1 > Tc1$
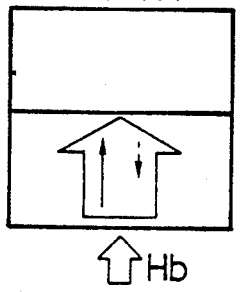
(3) Tp
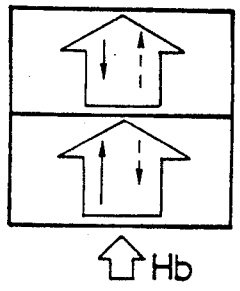
(4) ROOM TEMP.
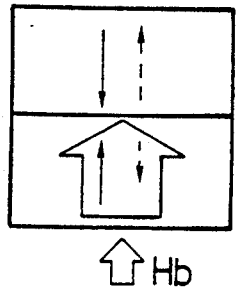
(5) ROOM TEMP.
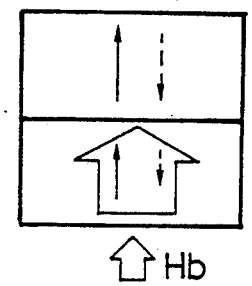
(6) $Tr0 < Tc1$
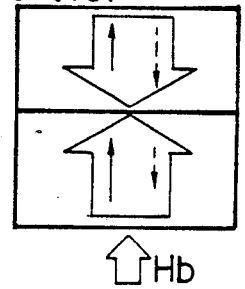
(7) Tp
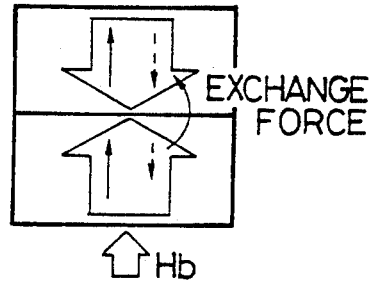
EXCHANGE FORCE
(8) ROOM TEMP.
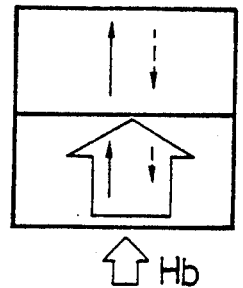

FIG. 10
(1) 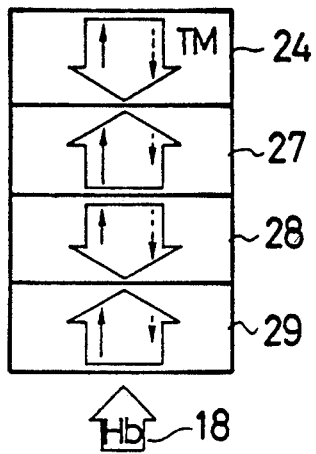
(2) 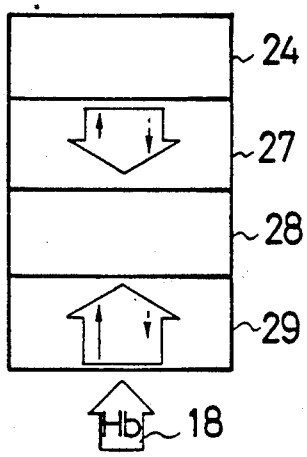
(3) 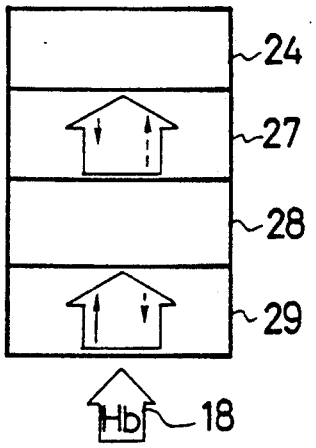
(4) 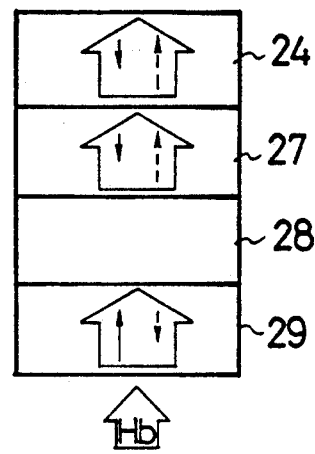
(5) 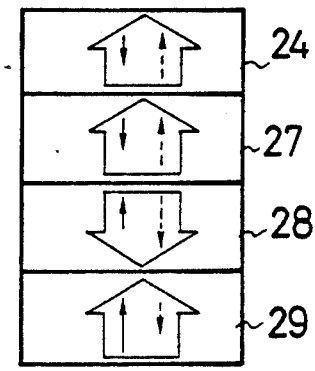
(6) 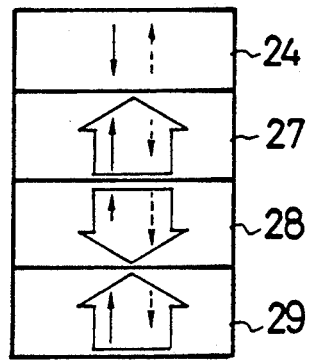

FIG. 11
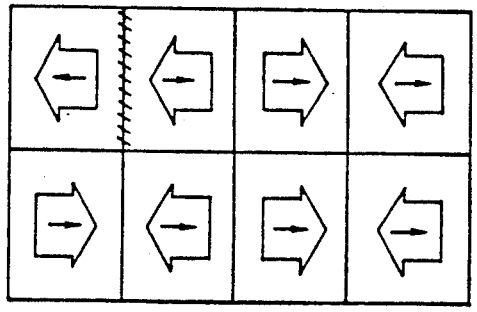
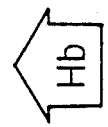
|  | t | Ms | Hc | Tc | Hw1 | Sw |
|---|---|---|---|---|---|---|
| $Tb_{21}Fe_{79}$ | 400 | 70 | 7000 | 135 | 3600 | 2 |
| $Gd_5Dy_{22}Fe_{65}Co_8$ | 450 | 90 | 2000 | 230 | 1700 | 3.4 |
| $Tb_{16}Dy_4Fe_{80}$ | 200 | 70 | 2200 | 115 | 7100 | 5.4 |
| $Tb_{24}Co_{76}$ | 2000 | 240 | 2000 | >300 | 560 |  |
LAYER-1
[1] Tstor : Hc1 > Hw1(2)
[2] Tread : Hc1 > Hw1(2)
[3] TL : Hc1 < Hw1(2) − Hb
LAYER-2
[4] Tini : Hc2 < Hw2(3) − Hw2(1) + Hb
[5] TL < : Hc2 > Hw2(3) − Hw2(1) + Hb
Hc2 > Hw2(1) − Hw2(3) − Hb
[6] Tc1 < : Hc2 < Hb
LAYER-3
[7] Tini : Hc3 < Hw3(4) − Hw3(2) + Hb
LAYER-4
[8] Tstor : Hc4 > −Hw4(3)
[9] Tall. : Hc4 > Hw4(3) + Hb

|  | t | Ms | Hc | Tc | Hwi | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{16}Dy_4Fe_{80}$ | 200 | 70 | 2200 | 115 | 6800 | 3.6 |
| $Tb_{20}Co_{80}$ | 2000 | 250 | 3000 | >300 | 550 | 5.5 |

LAYER-1
[1] Tstor : Hc1 > Hw1(2)
[2] Tread : Hc1 > Hw1(2)
[3] TL    : Hc1 < Hw1(2) − Hb LAYER-2
[4] Tini  : Hc2 < Hw2(3) − Hw2(1)
[5] TL <  : Hc2 > Hw2(1) − Hw2(3) + Hb
          : Hc2 > Hw2(3) − Hw2(1) − Hb

[6] Tc1 < : Hc2 < Hb

LAYER-3
[7] Tini  : Hc3 < Hw3(4) − Hw3(2)

LAYER-4
[8] Tstor : Hc4 > Hw4(3)
[9] Tall  : Hc4 > Hw4(3)

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| TM | $Tb_{16}Dy_4Fe_{80}$ | 200 | 70 | 2200 | 115 | 7100 | 3.5 |
| TM | $Tb_{20}Co_{80}$ | 2000 | 250 | 3000 | >300 | 550 | 5.5 |

```
LAYER-1
 [1] Tstor : Hc1 > Hw1(2)
 [2] Tread : Hc1 > Hw1(2) + Hb
 [3] TL    : Hc1 < Hw1(2) + Hb
LAYER-2
 [4] Tini  : Hc2 < Hw2(3) − Hw2(1)
 [5] TL <  : Hc2 > Hw2(1) − Hw2(3) + Hb
           : Hc2 > Hw2(3) − Hw2(1) − Hb
 [6] Tc1 < : Hc2 < Hb
LAYER-3
 [7] Tini  : Hc3 < Hw3(4) − Hw3(2)
LAYER-4
 [8] Tstor : Hc4 > Hw4(3)
 [9] Tall  : Hc4 > Hw4(3)
```

| | t | Ms | Hc | Tc | Hwi | Sw |
|---|---|---|---|---|---|---|
| $Tb_{27}Fe_{73}$ | 400 | 90 | 4500 | 135 | 2500 | |
| $Gd_5Dy_{15}Fe_{72}Co_8$ | 450 | 80 | 2000 | 220 | 2400 | 1.8 |
| $Tb_{16}Dy_4Fe_{80}$ | 200 | 70 | 2200 | 115 | 7100 | 3.5 |
| $Tb_{20}Co_{80}$ | 2000 | 250 | 3000 | >300 | 550 | 5.5 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tini : Hc2 < Hw2(3) − Hw2(1)
[5] TL < : Hc2 > Hw2(1) − Hw2(3) + Hb
         : Hc2 > Hw2(3) − Hw2(1) − Hb
[6] Tc1 < : Hc2 < Hb
LAYER-3
[7] Tini : Hc3 < Hw3(4) − Hw3(2)
LAYER-4
[8] Tstor : Hc4 > Hw4(3)
[9] Tall  : Hc4 > Hw4(3)

| | a1 | a2 | |
|---|---|---|---|
| re | ← | → | |
| TM | ↓ | → | |
| TM | → | → | |
| TM | → | → | |

Hb

FIG. 15
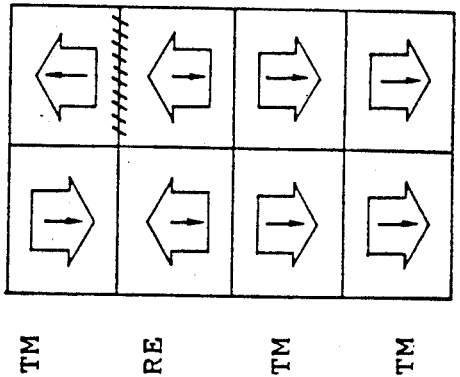
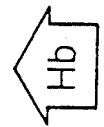
|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{20}Co_{80}$ | 2000 | 250 | 3000 | >300 | 540 | 5.4 |
LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1) + Hb
[5] TL ∨  : Hc2 > Hw2(3) − Hw2(1) + Hb
          : Hc2 > Hw2(1) − Hw2(3) − Hb
[6] Tc1 ∨ : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3)

|  | t | Ms | Hc | Tc | Hwi | Sw |
|---|---|---|---|---|---|---|
| $Gd_{12}Dy_{12}Fe_{76}$ | 400 | 100 | 5000 | 145 | 2500 |  |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{20}Co_{80}$ | 2000 | 250 | 3000 | >300 | 540 | 5.4 |

```
LAYER-1
  [1] Tstor  :  Hc1 > Hw1(2)
  [2] Tread  :  Hc1 > Hw1(2) + Hb
  [3] TL     :  Hc1.< Hw1(2) + Hb
LAYER-2
  [4] Tini   :  Hc2 < Hw2(3) − Hw2(1) + Hb
  [5] TL <   :  Hc2 > Hw2(3) − Hw2(1) + Hb
               Hc2 > Hw2(1) − Hw2(3) − Hb
  [6] Tc1 <  :  Hc2 < Hb
LAYER-3
  [7] Tini   :  Hc3 < Hw3(4) − Hw3(2) + Hb
LAYER-4
  [8] Tstor  :  Hc4 > Hw4(3)
  [9] Tall   :  Hc4 > Hw4(3)
```

|    |                       | t    | Ms   | Hc   | Tc   | Hwi  | Sw  |
|----|-----------------------|------|------|------|------|------|-----|
| re | $Tb_{27}Fe_{73}$      | 400  | 90   | 4500 | 135  | 2500 | 1.8 |
| RE | $Gd_5Dy_{22}Fe_{65}Co_8$ | 450 | 90   | 2000 | 230  | 1900 | 3.3 |
| TM | $Tb_{16}Dy_4Fe_{80}$  | 200  | 70   | 2200 | 115  | 7500 | 5.4 |
| TM | $Tb_{20}Co_{80}$      | 2000 | 250  | 3000 | >300 | 540  |     |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1) + Hb
[5] TL  < : Hc2 > Hw2(3) − Hw2(1) + Hb
       Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3)

|  | t | Ms | Hc | Tc | Hw1 | Sw |
|---|---|---|---|---|---|---|
| $Tb_{21}Fe_{79}$ | 400 | 70 | 7000 | 135 | 3600 | 2 |
| $Gd_5Dy_{25}Fe_{62}Co_8$ | 450 | 80 | 1700 | 220 | 1800 | 3.3 |
| $Tb_{16}Dy_4Fe_{80}$ | 200 | 70 | 2200 | 115 | 6400 | 5.1 |
| $Tb_{20}Co_{80}$ | 2000 | 250 | 3000 | >300 | 510 | |

LAYER-1
[1] Tstor : Hc1 > Hw1(2)
[2] Tread : Hc1 > Hw1(2) − Hb (>0)
[3] TL   : Hc1 < Hw1(2) + Hb
LAYER-2
[4] Tini  : Hc2 < Hw2(3) − Hw2(1)
[5] TL <  : Hc2 > Hw2(1) − Hw2(3) − Hb (>0)
            Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > Hw4(3)
[9] Tall  : Hc4 > Hw4(3) − Hb (>0)

FIG. 19
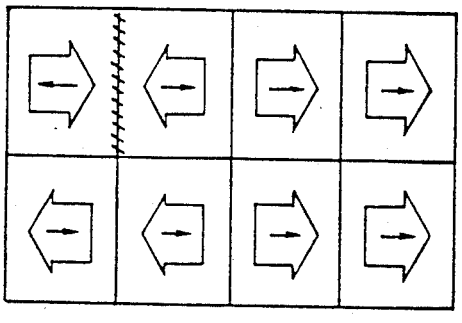
|  | t | Ms | Hc | Tc | Hw1 | Sw |
|---|---|---|---|---|---|---|
| RE $Gd_{12}Dy_{12}Fe_{76}$ | 400 | 100 | 5000 | 145 | 2500 | 2 |
| re $Gd_5Dy_{25}Fe_{62}Co_8$ | 450 | 80 | 1700 | 220 | 1800 | 3.3 |
| TM $Tb_{16}Dy_4Fe_{80}$ | 200 | 70 | 2200 | 115 | 6400 | 5.1 |
| TM $Tb_{20}Co_{80}$ | 2000 | 250 | 3000 | >300 | 510 |  |
 Hb
```
LAYER-1
[1] Tstor : Hc1 > Hw1(2)
[2] Tread : Hc1 > Hw1(2)
[3] TL    : Hc1 < Hw1(2) - Hb
LAYER-2
[4] Tini  : Hc2 < Hw2(3) - Hw2(1)
[5] TL    : Hc2 > Hw2(1) - Hw2(3) - Hb (>0)
             Hc2 > Hw2(3) - Hw2(1) + Hb (<0)
[6] Tc1 < : Hc2 < -Hb (>0)
LAYER-3
[7] Tini  : Hc3 < Hw3(4) - Hw3(2)
LAYER-4
[8] Tstor : Hc4 > Hw4(3)
[9] Tall  : Hc4 > Hw4(3) - Hb (>0)
```

FIG. 20
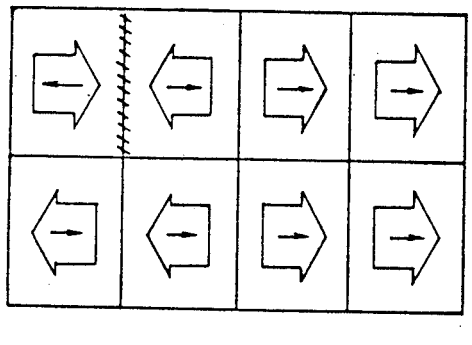
|  |  | t | Ms | Hc | Tc | Hw1 | Sw |
|--|--|--|--|--|--|--|--|
| re | $Tb_{27}Fe_{73}$ | 400 | 90 | 4500 | 135 | 2500 | 1.8 |
| re | $Gd_5Dy_{25}Fe_{62}Co_8$ | 450 | 80 | 1700 | 220 | 2100 | 3.3 |
| TM | $Tb_{16}Dy_4Fe_{80}$ | 200 | 70 | 2200 | 115 | 6400 | 5.1 |
| TM | $Tb_{20}Co_{80}$ | 2000 | 250 | 3000 | >300 | 510 |  |
```
LAYER-1
[1] Tstor : Hc1 > Hw1(2)
[2] Tread : Hc1 > Hw1(2)
[3] TL    : Hc1 < Hw1(2) - Hb
LAYER-2
[4] Tini  : Hc2 < Hw2(3) - Hw2(1)
[5] TL <  : Hc2 > Hw2(1) - Hw2(3) - Hb (>0)
          : Hc2 > Hw2(3) - Hw2(1) + Hb (<0)
[6] Tc1 < : Hc2 < -Hb (>0)
LAYER-3
[7] Tini  : Hc3 < Hw3(4) - Hw3(2)
LAYER-4
[8] Tstor : Hc4 > Hw4(3)
[9] Tall  : Hc4 > Hw4(3) - Hb (>0)
```

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{20}Dy_4Fe_{76}$ | 150 | 90 | 2000 | 115 | 6700 | 3.6 |
| $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2)
[3] TL    : Hc1 < Hw1(2) - Hb LAYER-2
[4] Tini  : Hc2 < Hw2(3) - Hw2(1)
[5] TL <  : Hc2 > Hw2(1) - Hw2(3) + Hb
           : Hc2 > Hw2(3) - Hw2(1) - Hb
[6] Tc1 < : Hc2 < Hb LAYER-3
[7] Tini  : Hc3 < Hw3(4) - Hw3(2)

LAYER-4
[8] Tstor : Hc4 > -Hw4(3)
[9] Tall  : Hc4 > Hw4(3)

| a1 | a2 | |
|---|---|---|
| → | ← | TM |
| → | → | TM |
| ← | ← | RE |
| → | → | TM |

Hb ⇐

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 |  |
| $Gd_5Dy_{15}Fe_{72}Co_8$ | 450 | 80 | 2000 | 220 | 2100 | 2 |
| $Tb_{20}Dy_4Fe_{76}$ | 150 | 90 | 2000 | 115 | 7000 | 3.5 |
| $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

| | t | Ms | Hc | Tc | Hwi | Sw |
|---|---|---|---|---|---|---|
| $Tb_{27}Fe_{73}$ | 400 | 90 | 4500 | 135 | 2500 | 1.8 |
| $Gd_5Dy_{15}Fe_{72}Co_8$ | 450 | 80 | 2000 | 220 | 2400 | 3.5 |
| $Tb_{20}Dy_4Fe_{76}$ | 150 | 90 | 2000 | 115 | 7000 | 5.4 |
| $Tb_{20}Co_{80}$ | 2000 | 250 | 3000 | >300 | 540 | |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

FIG. 24
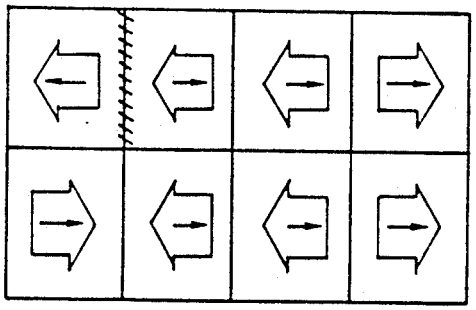
| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{20}Co_{80}$ | 2000 | 250 | 3000 | >300 | 520 | 5.2 |
LAYER-1
[1] Tstor : Hc1 > Hw1(2)
[2] Tread : Hc1 > Hw1(2)
[3] TL   : Hc1 < Hw1(2) − Hb
LAYER-2
[4] Tini : Hc2 < Hw2(3) − Hw2(1) + Hb
[5] TL ∨ : Hc2 > Hw2(3) − Hw2(1) + Hb
         Hc2 > Hw2(1) − Hb
[6] Tc1 ∨ : Hc2 < Hb
LAYER-3
[7] Tini : Hc3 < Hw3(4) − Hw3(2) + Hb
LAYER-4
[8] Tstor : Hc4 > −Hw4(3)
[9] Tall : Hc4 > Hw4(3)

| | t | Ms | Hc | Tc | Hw1 | Sw |
|---|---|---|---|---|---|---|
| RE | $Gd_{12}Dy_{12}Fe_{76}$ | 400 | 100 | 5000 | 145 | 2500 | 2 |
| RE | $Gd_5Dy_{22}Fe_{65}Co_8$ | 450 | 90 | 2000 | 230 | 1700 | 3.4 |
| RE | $Tb_{20}Dy_4Fe_{76}$ | 150 | 90 | 2000 | 115 | 6700 | 5.2 |
| TM | $Tb_{20}Co_{80}$ | 2000 | 250 | 3000 | >300 | 520 | |

LAYER-1
[1] Tstor : Hc1 > Hw1(2)
[2] Tread : Hc1 > Hw1(2) + Hb
[3] TL    : Hc1 < Hw1(2) + Hb LAYER-2
[4] Tini  : Hc2 < Hw2(3) − Hw2(1) + Hb
[5] TL <  : Hc2 > Hw2(3) − Hw2(1) + Hb
         : Hc2 > Hw2(1) − Hw2(3) − Hb
[6] Tc1 < : Hc2 < Hb LAYER-3
[7] Tini  : Hc3 < Hw3(4) − Hw3(2) + Hb LAYER-4
[8] Tstor : Hc4 > −Hw4(3)
[9] Tall  : Hc4 > Hw4(3)

|   |   | t | Ms | Hc | Tc | Hwi | Sw |
|---|---|---|---|---|---|---|---|
| re | $Tb_{27}Fe_{73}$ | 400 | 90 | 4500 | 135 | 2500 |  |
| RE | $Gd_5Dy_{22}Fe_{65}Co_8$ | 450 | 90 | 2000 | 230 | 1900 | 1.8 |
| RE | $Tb_{20}Dy_4Fe_{76}$ | 150 | 90 | 2000 | 115 | 7000 | 3.3 |
| TM | $Tb_{20}Co_{80}$ | 2000 | 250 | 3000 | >300 | 520 | 5.2 |

LAYER-1
[1] Tstor : $Hc1 > Hw1(2)$
[2] Tread : $Hc1 > Hw1(2) + Hb$
[3] TL : $Hc1 < Hw1(2) + Hb$
LAYER-2
[4] Tini : $Hc2 < Hw2(3) - Hw2(1) + Hb$
[5] TL < : $Hc2 > Hw2(3) - Hw2(1) + Hb$
          $Hc2 > Hw2(1) - Hw2(3) - Hb$
[6] Tc1 < : $Hc2 < Hb$
LAYER-3
[7] Tini : $Hc3 < Hw3(4) - Hw3(2) + Hb$
LAYER-4
[8] Tstor : $Hc4 > -Hw4(3)$
[9] Tall : $Hc4 > Hw4(3)$

|  | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{20}Dy_4Fe_{76}$ | 150 | 90 | 2000 | 115 | 6300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2) − Hb (>0)
[3] TL    : Hc1 < Hw1(2) + Hb LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)

[6] Tc1 < : Hc2 < −Hb (>0)

LAYER-3
[7] Tini  : Hc3 < Hw3(4) − Hw3(2)

LAYER-4
[8] Tstor : Hc4 > −Hw4(3)
[9] Tall  : Hc4 > Hw4(3) − Hb (>0)

|  | a1 | a2 |
|---|---|---|
| TM | → | ⇐ |
| re | ⇒ | ⇐ |
| RE | ⇐ | → |
| TM | ⇒ | ⇒ |

Hb ⇒

|  | t | Ms | Hc | Tc | Hwi | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{20}Dy_4Fe_{76}$ | 150 | 90 | 2000 | 115 | 6300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3) − Hb (>0)

|  | a1 | a2 |
|---|---|---|
| RE | ⇐ | ⇒ |
| re | ⇐ | ⇐ |
| RE | ⇐ | ⇐ |
| TM | ⇒ | ⇒ |

Hb

| | | t | Ms | Hc | Tc | Hw1 | Sw |
|---|---|---|---|---|---|---|---|
| a1 ← / a2 → | re | $Tb_{27}Fe_{73}$ | 400 | 90 | 4500 | 135 | 2500 | 1.8 |
| a1 ← / a2 ← | re | $Gd_5Dy_{25}Fe_{62}Co_8$ | 450 | 80 | 1700 | 220 | 2100 | 3.3 |
| a1 ← / a2 ← | RE | $Tb_{20}Dy_4Fe_{76}$ | 150 | 90 | 2000 | 115 | 6300 | 5 |
| a1 → / a2 → | TM | $Tb_{20}Co_{80}$ | 2000 | 250 | 3000 | >300 | 500 | |

Hb

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3) − Hb (>0)

| | t | Ms | Hc | Tc | Hwi | Sw |
|---|---|---|---|---|---|---|
| TM $Tb_{21}Fe_{79}$ | 400 | 70 | 7000 | 135 | 3600 | |
| TM $Gd_5Dy_{15}Fe_{72}Co_8$ | 450 | 80 | 2000 | 220 | 2200 | 2 |
| re $Tb_{23}Dy_4Fe_{73}$ | 150 | 170 | 700 | 115 | 2900 | 3.6 |
| TM $Tb_{20}Co_{80}$ | 2000 | 250 | 3000 | >300 | 510 | 5.1 |

LAYER-1
[1] Tstor : Hc1 > Hw1(2)
[2] Tread : Hc1 > Hw1(2)
[3] TL : Hc1 < Hw1(2) — Hb
LAYER-2
[4] Tini : Hc2 < Hw2(3) — Hw2(1)
[5] TL < : Hc2 > Hw2(1) — Hw2(3) + Hb
    Hc2 > Hw2(3) — Hw2(1) — Hb
[6] Tc1 < : Hc2 < Hb
LAYER-3
[7] Tini : Hc3 < Hw3(4) — Hw3(2)
LAYER-4
[8] Tstor : Hc4 > —Hw4(3)
[9] Tall : Hc4 > Hw4(3)

|    |                          | t    | Ms   | Hc   | Tc   | Hw1  | Sw  |
|----|--------------------------|------|------|------|------|------|-----|
| RE | $Gd_{12}Dy_{12}Fe_{76}$  | 400  | 100  | 5000 | 145  | 2500 |     |
| TM | $Gd_5Dy_{15}Fe_{72}Co_8$ | 450  | 80   | 2000 | 220  | 2100 | 2   |
| re | $Tb_{23}Dy_4Fe_{73}$     | 150  | 170  | 700  | 115  | 3100 | 3.5 |
| TM | $Tb_{20}Co_{80}$         | 2000 | 250  | 3000 | >300 | 510  | 5.1 |

```
LAYER-1
 [1] Tstor : Hc1 > Hw1(2)
 [2] Tread : Hc1 > Hw1(2) + Hb
 [3] TL    : Hc1 < Hw1(2) + Hb
LAYER-2
 [4] Tini  : Hc2 < Hw2(3) - Hw2(1)
 [5] TL <  : Hc2 > Hw2(1) - Hw2(3) + Hb
           : Hc2 > Hw2(3) - Hw2(1) - Hb
           : Hc2 < Hb
 [6] Tc1 < :
LAYER-3
 [7] Tini  : Hc3 < Hw3(4) - Hw3(2)
LAYER-4
 [8] Tstor : Hc4 > -Hw4(3)
 [9] Tall  : Hc4 > Hw4(3)
```

| | | t | Ms | Hc | Tc | Hwi | Sw |
|---|---|---|---|---|---|---|---|
| $Tb_{27}Fe_{73}$ | | 400 | 90 | 4500 | 135 | 2500 | |
| $Gd_5Dy_{15}Fe_{72}Co_8$ | | 450 | 80 | 2000 | 220 | 2400 | 1.8 |
| $Tb_{23}Dy_4Fe_{73}$ | | 150 | 170 | 700 | 115 | 3100 | 3.5 |
| $Tb_{20}Co_{80}$ | | 2000 | 250 | 3000 | >300 | 510 | 5.1 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
          : Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

Hb

|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| TM | $Tb_{20}Co_{80}$ | 2000 | 250 | 3000 | >300 | 500 | 5 |

```
LAYER-1
  [1] Tstor  : Hc1 > Hw1(2)
  [2] Tread  : Hc1 > Hw1(2)
  [3] TL     : Hc1 < Hw1(2) − Hb
LAYER-2
  [4] Tini   : Hc2 < Hw2(3) − Hw2(1) + Hb
  [5] TL <   : Hc2 > Hw2(3) − Hw2(1) + Hb
             : Hc2 > Hw2(1) − Hw2(3) − Hb
  [6] Tc1 <  : Hc2 < Hb
LAYER-3
  [7] Tini   : Hc3 < Hw3(4) − Hw3(2) + Hb
LAYER-4
  [8] Tstor  : Hc4 > −Hw4(3)
  [9] Tall   : Hc4 > Hw4(3)
```

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 70 | 115 | 3100 | 3.4 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2) + Hb
[3] TL : Hc1 < Hw1(2) + Hb
LAYER-2
[4] Tini : Hc2 < Hw2(3) − Hw2(1) + Hb
[5] TL < : Hc2 > Hw2(3) − Hw2(1) + Hb
 Hc2 > Hw2(1) − Hw2(3) − Hb
[6] Tc1 < : Hc2 < Hb
LAYER-3
[7] Tini : Hc3 < Hw3(4) − Hw3(2) + Hb
LAYER-4
[8] Tstor : Hc4 > −Hw4(3)
[9] Tall : Hc4 > Hw4(3)

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| RE | $Gd_5Dy_{22}Fe_{65}Co_8$ | 450 | 90 | 2000 | 230 | 1900 | 1.8 |
| re | $Tb_{23}Dy_4Fe_{73}$ | 150 | 170 | 700 | 115 | 3300 | 3.3 |
| TM | $Tb_{20}Co_{80}$ | 2000 | 250 | 3000 | >300 | 500 | 5 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tini   : Hc2 < Hw2(3) - Hw2(1) + Hb
 [5] TL     : Hc2 > Hw2(3) - Hw2(1) + Hb
            Hc2 > Hw2(1) - Hw2(3) - Hb
 [6] Tc1    : Hc2 < Hb
LAYER-3
 [7] Tini   : Hc3 < Hw3(4) - Hw3(2) + Hb
LAYER-4
 [8] Tstor  : Hc4 > -Hw4(3)
 [9] Tall   : Hc4 > Hw4(3)
```

|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2) − Hb (>0)
[3] TL : Hc1 < Hw1(2) + Hb LAYER-2
[4] Tini : Hc2 < Hw2(3) − Hw2(1)
[5] TL < : Hc2 > Hw2(1) − Hw2(3) − Hb (>0)
         : Hc2 > Hw2(3) − Hw2(1) + Hb (<0)
[6] Tc1 < : Hc2 < −Hb (>0)

LAYER-3
[7] Tini : Hc3 < Hw3(4) − Hw3(2)

LAYER-4
[8] Tstor : Hc4 > −Hw4(3)
[9] Tall : Hc4 > Hw4(3) − Hb (>0)

| | | t | Ms | Hc | Tc | Hwi | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| re | $Tb_{23}Dy_4Fe_{73}$ | 150 | 170 | 700 | 115 | 3300 | 3.3 |
| TM | $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL   : Hc1 < Hw1(2) − Hb
LAYER-2
[4] Tini : Hc2 < Hw2(3) − Hw2(1)
[5] TL < : Hc2 > Hw2(1) − Hw2(3) − Hb (>0)
         : Hc2 > Hw2(3) − Hw2(1) + Hb (<0)
[6] Tc1 < : Hc2 < −Hb (>0)
LAYER-3
[7] Tini : Hc3 < Hw3(4) − Hw3(2)
LAYER-4
[8] Tstor : Hc4 > −Hw4(3)
[9] Tall  : Hc4 > Hw4(3) − Hb (>0)

FIG. 38
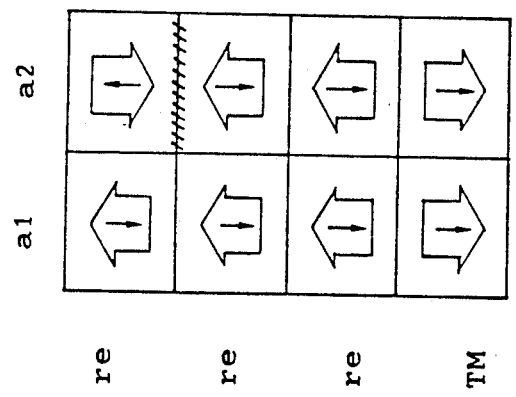
| | | t | Ms | Hc | Tc | Hwi | Sw |
|---|---|---|---|---|---|---|---|
| re | $Tb_{27}Fe_{73}$ | 400 | 90 | 4500 | 135 | 2500 | |
| re | $Gd_5Dy_{25}Fe_{62}Co_8$ | 450 | 80 | 1700 | 220 | 2100 | 1.8 |
| re | $Tb_{23}Dy_4Fe_{73}$ | 150 | 170 | 700 | 115 | 3300 | 3.3 |
| TM | $Tb_{20}Co_{80}$ | 2000 | 250 | 3000 | >300 | 500 | 5 |
 Hb
LAYER-1
[1] Tstor : Hc1 > Hw1(2)
[2] Tread : Hc1 > Hw1(2)
[3] TL     : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
           : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3) − Hb (>0)

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| TM | $Tb_{16}Dy_4Fe_{80}$ | 200 | 70 | 2200 | 115 | 6800 | 3.6 |
| RE | $Tb_{24}Co_{76}$ | 2000 | 240 | 2000 | >300 | 570 | 5.5 |

```
LAYER-1
 [1] Tstor :  Hc1 > Hw1(2)
 [2] Tread :  Hc1 > Hw1(2)
 [3] TL    :  Hc1 < Hw1(2) - Hb
LAYER-2
 [4] Tini  :  Hc2 < Hw2(3) - Hw2(1)
 [5] TL  <    Hc2 > Hw2(1) - Hw2(3) + Hb
              Hc2 > Hw2(3) - Hw2(1) - Hb
 [6] Tc1 <  :  Hc2 < Hb
LAYER-3
 [7] Tini  :  Hc3 < Hw3(4) - Hw3(2)
LAYER-4
 [8] Tstor :  Hc4 > -Hw4(3)
 [9] Tall  :  Hc4 > Hw4(3) + Hb
```

| | t | Ms | Hc | Tc | Hw1 | Sw |
|---|---|---|---|---|---|---|
| RE $Gd_{12}Dy_{12}Fe_{76}$ | 400 | 100 | 5000 | 145 | 2500 | |
| TM $Gd_5Dy_{15}Fe_{72}Co_8$ | 450 | 80 | 2000 | 220 | 2100 | 2 |
| TM $Tb_{16}Dy_4Fe_{80}$ | 200 | 70 | 2200 | 115 | 7100 | 3.5 |
| RE $Tb_{24}Co_{76}$ | 2000 | 240 | 2000 | >300 | 570 | 5.5 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > −Hw4(3)
[9] Tall  : Hc4 > Hw4(3) + Hb

FIG. 41
|    |                      | t    | Ms  | Hc   | Tc   | Hw1  | Sw  |
|----|----------------------|------|-----|------|------|------|-----|
| re | $Tb_{27}Fe_{73}$     | 400  | 90  | 4500 | 135  | 2500 |     |
| TM | $Gd_5Dy_{15}Fe_{72}Co_8$ | 450  | 80  | 2000 | 220  | 2400 | 1.8 |
| TM | $Tb_{16}Dy_4Fe_{80}$ | 200  | 70  | 2200 | 115  | 7100 | 3.5 |
| RE | $Tb_{24}Co_{76}$     | 2000 | 240 | 2000 | >300 | 570  | 5.5 |
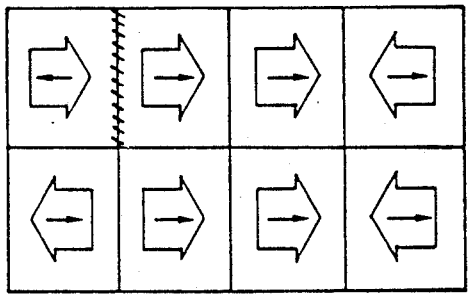
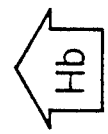
```
LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) - Hw2(1)
[5] TL <  : Hc2 > Hw2(1) - Hw2(3) + Hb
           Hc2 > Hw2(3) - Hw2(1) - Hb
[6] Tc1 < : Hc2 < Hb
LAYER-3
[7] Tini  : Hc3 < Hw3(4) - Hw3(2)
LAYER-4
[8] Tstor : Hc4 > -Hw4(3)
[9] Tall  : Hc4 > Hw4(3) + Hb
```

|   |   | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 |  |
| RE | $Gd_5Dy_{22}Fe_{65}Co_8$ | 450 | 90 | 2000 | 230 | 1700 | 2 |
| TM | $Tb_{16}Dy_4Fe_{80}$ | 200 | 70 | 2200 | 115 | 7100 | 3.4 |
| RE | $Tb_{24}Co_{76}$ | 2000 | 240 | 2000 | >300 | 560 | 5.4 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tini   : Hc2 < Hw2(3) − Hw2(1) + Hb
 [5] TL     : Hc2 > Hw2(3) − Hw2(1) + Hb
             Hc2 > Hw2(1) − Hw2(3) − Hb
 [6] Tc1    : Hc2 < Hb
LAYER-3
 [7] Tini   : Hc3 < Hw3(4) − Hw3(2) + Hb
LAYER-4
 [8] Tstor  : Hc4 > −Hw4(3)
 [9] Tall   : Hc4 > Hw4(3) + Hb
```

FIG. 43
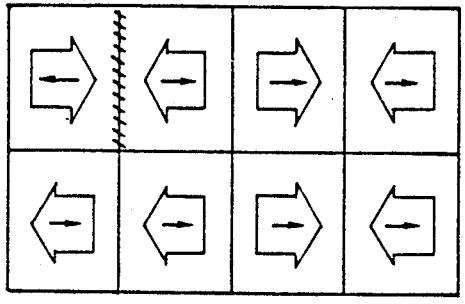
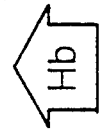
|    |    | t    | Ms  | Hc   | Tc   | Hw1  | Sw  |
|----|----|------|-----|------|------|------|-----|
| re | $Tb_{27}Fe_{73}$ | 400 | 90 | 4500 | 135 | 2500 |     |
| RE | $Gd_5Dy_{22}Fe_{65}Co_8$ | 450 | 90 | 2000 | 230 | 1900 | 1.8 |
| TM | $Tb_{16}Dy_4Fe_{80}$ | 200 | 70 | 2200 | 115 | 7500 | 3.3 |
| RE | $Tb_{24}Co_{76}$ | 2000 | 240 | 2000 | >300 | 560 | 5.4 |
LAYER-1
[1] Tstor : Hc1 > Hw1(2) + Hb
[2] Tread : Hc1 > Hw1(2) + Hb
[3] TL    : Hc1 < Hw1(2) + Hb
LAYER-2
[4] Tini  : Hc2 < Hw2(3) − Hw2(1) + Hb
[5] TL    : Hc2 > Hw2(3) − Hw2(1) + Hb
    Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > −Hw4(3)
[9] Tall  : Hc4 > Hw4(3) + Hb

FIG. 44
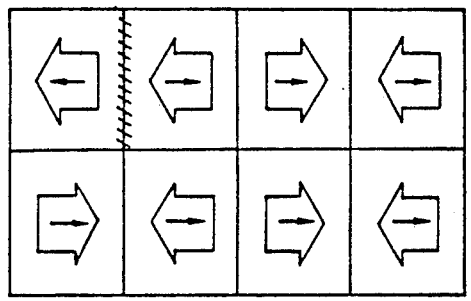
|  | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{24}Co_{76}$ | 2000 | 240 | 2000 | >300 | 530 | 5.1 |
LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 |  |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{24}Co_{76}$ | 2000 | 240 | 2000 | >300 | 530 | 5.1 |

```
LAYER-1
 [1] Tstor  : Hc1 > Hw1(2)
 [2] Tread  : Hc1 > Hw1(2)
 [3] TL     : Hc1 < Hw1(2) - Hb
LAYER-2
 [4] Tini   : Hc2 < Hw2(3) - Hw2(1)
 [5] TL <   : Hc2 > Hw2(1) - Hw2(3) - Hb  (>0)
            : Hc2 > Hw2(3) - Hw2(1) + Hb  (<0)
 [6] Tc1 <  : Hc2 < -Hb  (>0)
LAYER-3
 [7] Tini   : Hc3 < Hw3(4) - Hw3(2)
LAYER-4
 [8] Tstor  : Hc4 > -Hw4(3)
 [9] Tall   : Hc4 > Hw4(3)
```

FIG. 46
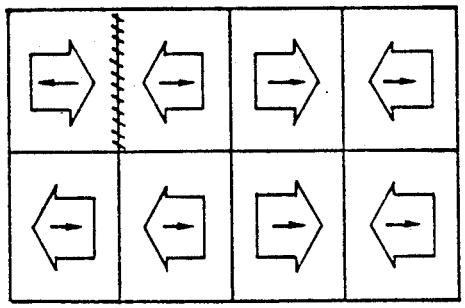
| | | t | Ms | Hc | Tc | Hw1 | Sw |
|---|---|---|---|---|---|---|---|
| re | $Tb_{27}Fe_{73}$ | 400 | 90 | 4500 | 135 | 2500 | 1.8 |
| re | $Gd_5Dy_{25}Fe_{62}Co_8$ | 450 | 80 | 1700 | 220 | 2100 | 3.3 |
| TM | $Tb_{16}Dy_4Fe_{80}$ | 200 | 70 | 2200 | 115 | 6400 | 5.1 |
| RE | $Tb_{24}Co_{76}$ | 2000 | 240 | 2000 | >300 | 530 | |
LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

FIG.47
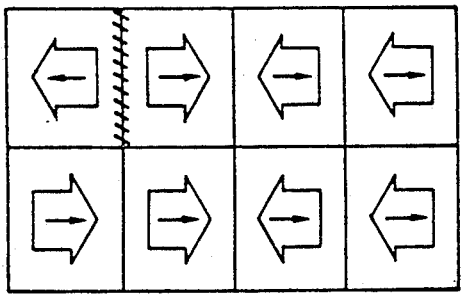
|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 |  |
| TM | $Gd_5Dy_{15}Fe_{72}Co_8$ | 450 | 80 | 2000 | 220 | 2200 | 2 |
| RE | $Tb_{20}Dy_4Fe_{76}$ | 150 | 90 | 2000 | 115 | 6700 | 3.6 |
| RE | $Tb_{24}Co_{76}$ | 2000 | 240 | 2000 | >300 | 560 | 5.4 |
```
LAYER-1
 [1] Tstor : Hc1 > Hw1(2)
 [2] Tread : Hc1 > Hw1(2)
 [3] TL    : Hc1 < Hw1(2) - Hb
LAYER-2
 [4] Tini  : Hc2 < Hw2(3) - Hw2(1)
 [5] TL <  : Hc2 > Hw2(1) - Hw2(3) + Hb
            Hc2 > Hw2(3) - Hw2(1) - Hb
 [6] Tc1 < : Hc2 < Hb
LAYER-3
 [7] Tini  : Hc3 < Hw3(4) - Hw3(2)
LAYER-4
 [8] Tstor : Hc4 > Hw4(3)
 [9] Tall  : Hc4 > Hw4(3) + Hb
```

| | t | Ms | Hc | Tc | Hw1 | Sw |
|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| RE | $Tb_{20}Dy_4Fe_{76}$ | 150 | 90 | 2000 | 115 | 7000 | 3.5 |
| RE | $Tb_{24}Co_{76}$ | 2000 | 240 | 2000 | >300 | 560 | 5.4 |

LAYER-1
[1] Tstor  : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL ∨  : Hc2 > Hw2(1) − Hw2(3) + Hb
          : Hc2 > Hw2(3) − Hw2(1) − Hb
[6] Tc1 ∨ : Hc2 < Hb
LAYER-3
[7] Tini  : Hc3 < Hw3(4) − Hw3(2)
LAYER-4
[8] Tstor : Hc4 > Hw4(3)
[9] Tall  : Hc4 > Hw4(3) + Hb

|  | | t | Ms | Hc | Tc | Hw1 | Sw |
|---|---|---|---|---|---|---|---|
| re | $Tb_{27}Fe_{73}$ | 400 | 90 | 4500 | 135 | 2500 | 1.8 |
| TM | $Gd_5Dy_{15}Fe_{72}Co_8$ | 450 | 80 | 2000 | 220 | 2400 | 3.5 |
| RE | $Tb_{20}Dy_4Fe_{76}$ | 150 | 90 | 2000 | 115 | 7000 | 5.4 |
| RE | $Tb_{24}Co_{76}$ | 2000 | 240 | 2000 | >300 | 560 | |

LAYER-1
[1] Tstor : Hc1 > Hw1(2)
[2] Tread : Hc1 > Hw1(2) + Hb
[3] TL    : Hc1 < Hw1(2) + Hb LAYER-2
[4] Tini : Hc2 < Hw2(3) − Hw2(1)
[5] TL <  : Hc2 > Hw2(1) − Hw2(3) + Hb
          : Hc2 > Hw2(3) − Hw2(1) − Hb
[6] Tc1 < : Hc2 < Hb LAYER-3
[7] Tini : Hc3 < Hw3(4) − Hw3(2)

LAYER-4
[8] Tstor : Hc4 > Hw4(3)
[9] Tall  : Hc4 > Hw4(3) + Hb

|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 |  |
| RE | $Gd_5Dy_{22}Fe_{65}Co_8$ | 450 | 90 | 2000 | 230 | 1700 | 2 |
| RE | $Tb_{20}Dy_4Fe_{76}$ | 150 | 90 | 2000 | 115 | 6700 | 3.4 |
| RE | $Tb_{24}Co_{76}$ | 2000 | 240 | 2000 | >300 | 540 | 5.2 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1) + Hb
[5] TL  < : Hc2 > Hw2(3) − Hw2(1) + Hb
            Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{24}Co_{76}$ | 2000 | 240 | 2000 | >300 | 540 | 5.2 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tini   : Hc2 < Hw2(3) - Hw2(1) + Hb
 [5] TL <   : Hc2 > Hw2(3) - Hw2(1) + Hb
            : Hc2 > Hw2(1) - Hw2(3) - Hb
 [6] Tc1 <  : Hc2 < Hb
LAYER-3
 [7] Tini   : Hc3 < Hw3(4) - Hw3(2) + Hb
LAYER-4
 [8] Tstor  : Hc4 > Hw4(3)
 [9] Tall   : Hc4 > Hw4(3) + Hb
```

|    | a1 | a2 |    | | t | Ms | Hc | Tc | Hw1 | Sw |
|----|----|----|----|---|------|-----|------|------|------|-----|
| re |    |    | $Tb_{27}Fe_{73}$ | | 400 | 90 | 4500 | 135 | 2500 | |
| RE |    |    | $Gd_5Dy_{22}Fe_{65}Co_8$ | | 450 | 90 | 2000 | 230 | 1900 | 1.8 |
| RE |    |    | $Tb_{20}Dy_4Fe_{76}$ | | 150 | 90 | 2000 | 115 | 7000 | 3.3 |
| RE |    |    | $Tb_{24}Co_{76}$ | | 2000 | 240 | 2000 | >300 | 540 | 5.2 |

Hb

LAYER-1
[1] Tstor : Hc1 > Hw1(2) − Hw2(1) + Hb
[2] Tread : Hc1 > Hw1(2) − Hw2(1) + Hb
[3] TL    : Hc1 < Hw1(2) − Hw2(1) − Hb
LAYER-2
[4] Tinl  : Hc2 < Hw2(3) − Hw2(1) + Hb
[5] TL <  : Hc2 > Hw2(3) − Hw2(1) + Hb
           Hc2 > Hw2(1) − Hw2(3) − Hb
[6] Tc1 <  : Hc2 < Hb
LAYER-3
[7] Tinl  : Hc3 < Hw3(4) − Hw3(2) + Hb
LAYER-4
[8] Tstor : Hc4 > Hw4(3)
[9] Tall  : Hc4 > Hw4(3) + Hb

FIG. 53
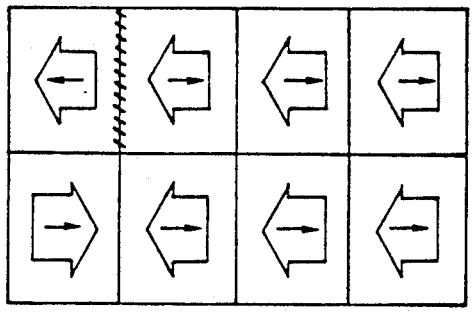
|  | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{20}Dy_4Fe_{76}$ | 150 | 90 | 2000 | 115 | 6300 | 3.3 |
| $Tb_{24}Co_{76}$ | 2000 | 240 | 2000 | >300 | 520 | 5 |
 Hb
```
LAYER-1
[1] Tstor : Hc1 > Hw1(2)
[2] Tread : Hc1 > Hw1'(2) - Hb (>0)
[3] TL    : Hc1 < Hw1(2) + Hb
LAYER-2
[4] Tini  : Hc2 < Hw2(3) - Hw2(1)
[5] TL    : Hc2 > Hw2(1) - Hw2(3) - Hb (>0)
            Hc2 > Hw2(3) - Hw2(1) + Hb (<0)
[6] Tc1 < : Hc2 < -Hb (>0)
LAYER-3
[7] Tini  : Hc3 < Hw3(4) - Hw3(2)
LAYER-4
[8] Tstor : Hc4 > Hw4(3)
[9] Tall  : Hc4 > Hw4(3)
```

| | | t | Ms | Hc | Tc | Hwi | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| RE | $Tb_{24}Co_{76}$ | 2000 | 240 | 2000 | >300 | 520 | 5 |

LAYER-1
[1] Tstor : $Hc1 > Hw1(2)$
[2] Tread : $Hc1 > Hw1(2)$
[3] TL    : $Hc1 < Hw1(2) - Hb$
LAYER-2
[4] Tini  : $Hc2 < Hw2(3) - Hw2(1)$
[5] TL <  : $Hc2 > Hw2(1) - Hw2(3) - Hb \ (>0)$
          $Hc2 > Hw2(3) - Hw2(1) + Hb \ (<0)$
[6] Tc1 < : $Hc2 < -Hb \ (>0)$
LAYER-3
[7] Tini  : $Hc3 < Hw3(4) - Hw3(2)$
LAYER-4
[8] Tstor : $Hc4 > Hw4(3)$
[9] Tall  : $Hc4 > Hw4(3)$

|  | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| re | $Gd_5Dy_{25}Fe_{62}Co_8$ | 450 | 80 | 1700 | 220 | 2100 | 1.8 |
| RE | $Tb_{20}Dy_4Fe_{76}$ | 150 | 90 | 2000 | 115 | 6300 | 3.3 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > Hw4(3)
[9] Tall  : Hc4 > Hw4(3)

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| re | $Tb_{23}Dy_4Fe_{73}$ | 150 | 170 | 700 | 115 | 2900 | 3.6 |
| RE | $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2)
[3] TL : Hc1 < Hw1(2) − Hb LAYER-2
[4] Tini : Hc2 < Hw2(3) − Hw2(1)
[5] TL < Hc2 > Hw2(1) − Hw2(3) + Hb
      Hc2 > Hw2(3) − Hw2(1) − Hb
[6] Tc1 < : Hc2 < Hb LAYER-3
[7] Tini : Hc3 < Hw3(4) − Hw3(2)

LAYER-4
[8] Tstor : Hc4 > Hw4(3)
[9] Tall : Hc4 > Hw4(3) + Hb

|  |  | t | Ms | Hc | Tc | Hwi | Sw |
|---|---|---|---|---|---|---|---|
| RE | $Gd_{12}Dy_{12}Fe_{76}$ | 400 | 100 | 5000 | 145 | 2500 |  |
| TM | $Gd_5Dy_{15}Fe_{72}Co_8$ | 450 | 80 | 2000 | 220 | 2100 | 2 |
| re | $Tb_{23}Dy_4Fe_{73}$ | 150 | 170 | 700 | 115 | 3100 | 3.5 |
| RE | $Tb_{24}Co_{76}$ | 2000 | 240 | 2000 | >300 | 530 | 5.1 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tini   : Hc2 < Hw2(3) − Hw2(1)
 [5] TL <   : Hc2 > Hw2(1) − Hw2(3) + Hb
            : Hc2 > Hw2(3) − Hw2(1) − Hb
 [6] Tc1 <  : Hc2 < Hb
LAYER-3
 [7] Tini   : Hc3 < Hw3(4) − Hw3(2)
LAYER-4
 [8] Tstor  : Hc4 > Hw4(3)
 [9] Tall   : Hc4 > Hw4(3) + Hb
```

Hb

| | | t | Ms | Hc | Tc | Hw1 | Sw |
|---|---|---|---|---|---|---|---|
| $Tb_{27}Fe_{73}$ | re | 400 | 90 | 4500 | 135 | 2500 | 1.8 |
| $Gd_5Dy_{15}Fe_{72}Co_8$ | TM | 450 | 80 | 2000 | 220 | 2400 | 3.5 |
| $Tb_{23}Dy_4Fe_{73}$ | re | 150 | 170 | 700 | 115 | 3100 | 5.1 |
| $Tb_{24}Co_{76}$ | RE | 2000 | 240 | 2000 | >300 | 530 | |

```
LAYER-1
 [1] Tstor : Hc1 > Hw1(2)
 [2] Tread : Hc1 > Hw1(2) + Hb
 [3] TL    : Hc1 < Hw1(2) + Hb
LAYER-2
 [4] Tini  : Hc2 < Hw2(3) − Hw2(1)
 [5] TL <  : Hc2 > Hw2(1) − Hw2(3) + Hb
            Hc2 > Hw2(3) − Hw2(1) − Hb
 [6] Tc1 < : Hc2 < Hb
LAYER-3
 [7] Tini  : Hc3 < Hw3(4) − Hw3(2)
LAYER-4
 [8] Tstor : Hc4 > Hw4(3)
 [9] Tall  : Hc4 > Hw4(3) + Hb
```

|    |    | t    | Ms  | Hc   | Tc   | Hw1  | Sw  |
|----|----|------|-----|------|------|------|-----|
| TM | $Tb_{21}Fe_{79}$ | 400 | 70 | 7000 | 135 | 3600 |  |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL : Hc1 < Hw1(2) − Hb LAYER-2
[4] Tini : Hc2 < Hw2(3) − Hw2(1) + Hb
[5] TL : Hc2 > Hw2(3) − Hw2(1) + Hb
       Hc2 > Hw2(1) − Hw2(3) − Hb

[6] Tc1 : Hc2 < Hb

LAYER-3
[7] Tini : Hc3 < Hw3(4) − Hw3(2) + Hb

LAYER-4
[8] Tstor : Hc4 > Hw4(3)
[9] Tall : Hc4 > Hw4(3) + Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1) + Hb
[5] TL <  : Hc2 > Hw2(3) − Hw2(1) + Hb
          : Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3) + Hb

|  | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| RE | $Gd_5Dy_{22}Fe_{65}Co_8$ | 450 | 90 | 2000 | 230 | 1900 | 1.8 |
| re | $Tb_{23}Dy_4Fe_{73}$ | 150 | 170 | 700 | 115 | 3300 | 3.3 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2) + Hb
[3] TL    : Hc1 < Hw1(2) + Hb LAYER-2
[4] Tini  : Hc2 < Hw2(3) − Hw2(1) + Hb
[5] TL <  : Hc2 > Hw2(3) − Hw2(1) + Hb
           Hc2 > Hw2(1) − Hw2(3) − Hb

[6] Tc1 < : Hc2 < Hb

LAYER-3
[7] Tini  : Hc3 < Hw3(4) − Hw3(2) + Hb

LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{24}Co_{76}$ | 2000 | 240 | 2000 | >300 | 520 | 5 |

LAYER-1
[1] Tstor : $Hc1 > Hw1(2)$
[2] Tread : $Hc1 > Hw1(2) - Hb$ $(>0)$
[3] TL    : $Hc1 < Hw1(2) + Hb$
LAYER-2
[4] Tini  : $Hc2 < Hw2(3) - Hw2(1)$
[5] TL $<$ : $Hc2 > Hw2(1) - Hw2(3) - Hb$ $(>0)$
           $Hc2 > Hw2(3) - Hw2(1) + Hb$ $(<0)$
[6] Tc1 $<$ : $Hc2 < -Hb$ $(>0)$
LAYER-3
[7] Tini  : $Hc3 < Hw3(4) - Hw3(2)$
LAYER-4
[8] Tstor : $Hc4 > Hw4(3)$
[9] Tall  : $Hc4 > Hw4(3)$

|  | a1 | a2 |
|---|---|---|
| TM | ⇒ | ⇐ |
| re | ⇐ | ⇐ |
| re | ⇐ | ⇐ |
| RE | ⇐ | ⇐ |

Hb ⇒

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| re | $Tb_{23}Dy_4Fe_{73}$ | 150 | 170 | 700 | 115 | 3300 | 3.3 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL   : Hc1 < Hw1(2) − Hb
LAYER-2
[4] Tini : Hc2 < Hw2(3) − Hw2(1)
[5] TL < : Hc2 > Hw2(1) − Hw2(3) − Hb (>0)
         Hc2 > Hw2(3) − Hw2(1) + Hb (<0)
[6] Tc1 < : Hc2 < −Hb (>0)
LAYER-3
[7] Tini : Hc3 < Hw3(4) − Hw3(2)
LAYER-4
[8] Tstor : Hc4 > Hw4(3)
[9] Tall : Hc4 > Hw4(3)

| | | material | t | Ms | Hc | Tc | Hw1 | Sw |
|---|---|---|---|---|---|---|---|---|
| a1 a2 | re | $Tb_{27}Fe_{73}$ | 400 | 90 | 4500 | 135 | 2500 | 1.8 |
| | re | $Gd_5Dy_{25}Fe_{62}Co_8$ | 450 | 80 | 1700 | 220 | 2100 | 3.3 |
| | re | $Tb_{23}Dy_4Fe_{73}$ | 150 | 170 | 700 | 115 | 3300 | 5 |
| | RE | $Tb_{24}Co_{76}$ | 2000 | 240 | 2000 | >300 | 520 | |

LAYER-1
[1] Tstor : $Hc1 > Hw1(2)$
[2] Tread : $Hc1 > Hw1(2)$
[3] TL    : $Hc1 < Hw1(2) - Hb$
LAYER-2
[4] Tini  : $Hc2 < Hw2(3) - Hw2(1)$
[5] TL    : $Hc2 > Hw2(1) - Hw2(3) - Hb \ (>0)$
              $Hc2 > Hw2(3) - Hw2(1) + Hb \ (<0)$
[6] $Tc1 <$ : $Hc2 < -Hb \ (>0)$
LAYER-3
[7] Tini  : $Hc3 < Hw3(4) - Hw3(2)$
LAYER-4
[8] Tstor : $Hc4 > Hw4(3)$
[9] Tall  : $Hc4 > Hw4(3)$

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| TM | $Tb_{16}Dy_4Fe_{80}$ | 200 | 70 | 2200 | 115 | 6800 | 3.6 |
| re | $Tb_{27}Co_{73}$ | 2000 | 260 | 1500 | >300 | 530 | 5.5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) + Hb
      Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > −Hw4(3)
[9] Tall  : Hc4 > Hw4(3) + Hb Hb

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | 2 |
| $Gd_5Dy_{15}Fe_{72}Co_8$ | 450 | 80 | 2000 | 220 | 2100 | 3.5 |
| $Tb_{16}Dy_4Fe_{80}$ | 200 | 70 | 2200 | 115 | 7100 | 5.5 |
| $Tb_{27}Co_{73}$ | 2000 | 260 | 1500 | >300 | 530 | |

LAYER-1
[1] Tstor : Hc1 > Hw1(2)
[2] Tread : Hc1 > Hw1(2) + Hb
[3] TL    : Hc1 < Hw1(2) + Hb LAYER-2
[4] Tini  : Hc2 < Hw2(3) − Hw2(1)
[5] TL <  : Hc2 > Hw2(1) − Hw2(3) + Hb
            Hc2 > Hw2(3) − Hw2(1) − Hb
[6] Tc1 < : Hc2 > Hb LAYER-3
[7] Tini  : Hc3 < Hw3(4) − Hw3(2)

LAYER-4
[8] Tstor : Hc4 > −Hw4(3)
[9] Tall  : Hc4 > Hw4(3) + Hb

FIG. 67

|    |              | t    | Ms  | Hc   | Tc   | Hw1  | Sw  |
|----|--------------|------|-----|------|------|------|-----|
| re | $Tb_{27}Fe_{73}$ | 400  | 90  | 4500 | 135  | 2500 |     |
| TM | $Gd_5Dy_{15}Fe_{72}Co_8$ | 450  | 80  | 2000 | 220  | 2400 | 1.8 |
| TM | $Tb_{16}Dy_4Fe_{80}$ | 200  | 70  | 2200 | 115  | 7100 | 3.5 |
| re | $Tb_{27}Co_{73}$ | 2000 | 260 | 1500 | >300 | 530  | 5.5 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tini   : Hc2 < Hw2(3) - Hw2(1)
 [5] TL <   : Hc2 > Hw2(1) - Hw2(3) + Hb
            : Hc2 > Hw2(3) - Hw2(1) - Hb
 [6] Tc1 <  : Hc2 < Hb
LAYER-3
 [7] Tini   : Hc3 < Hw3(4) - Hw3(2)
LAYER-4
 [8] Tstor  : Hc4 > -Hw4(3)
 [9] Tall   : Hc4 > Hw4(3) + Hb
```

|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1) + Hb
[5] TL <  : Hc2 > Hw2(3) − Hw2(1) + Hb
         : Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > −Hw4(3)
[9] Tall  : Hc4 > Hw4(3) + Hb Hb (Left side: table with columns a1, a2 showing arrow directions labeled TM, RE, TM, re)

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1) + Hb
[5] TL <  : Hc2 > Hw2(3) − Hw2(1) + Hb
          : Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > −Hw4(3)
[9] Tall  : Hc4 > Hw4(3) + Hb

|     | t | Ms | Hc | Tc | Hw1 | Sw |
|---|---|---|---|---|---|---|
| $Tb_{27}Fe_{73}$ | 400 | 90 | 4500 | 135 | 2500 | 1.8 |
| $Gd_5Dy_{22}Fe_{65}Co_8$ | 450 | 90 | 2000 | 230 | 1900 | 3.3 |
| $Tb_{16}Dy_4Fe_{80}$ | 200 | 70 | 2200 | 115 | 7500 | 5.4 |
| $Tb_{27}Co_{73}$ | 2000 | 260 | 1500 | >300 | 520 | |

LAYER-1
[1] Tstor : $Hc1 > Hw1(2)$
[2] Tread : $Hc1 > Hw1(2) + Hb$
[3] TL : $Hc1 < Hw1(2) + Hb$ LAYER-2
[4] Tini : $Hc2 < Hw2(3) - Hw2(1) + Hb$
[5] TL < : $Hc2 > Hw2(3) - Hw2(1) + Hb$
$Hc2 > Hw2(1) - Hw2(3) - Hb$
[6] Tc1 < : $Hc2 < Hb$ LAYER-3
[7] Tini : $Hc3 < Hw3(4) - Hw3(2) + Hb$ LAYER-4
[8] Tstor : $Hc4 > -Hw4(3)$
[9] Tall : $Hc4 > Hw4(3) + Hb$

| | t | Ms | Hc | Tc | Hwi | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{27}Co_{73}$ | 2000 | 260 | 1500 | >300 | 490 | 5.1 |

LAYER-1
[1] Tstor : Hc1 > Hw1(2)
[2] Tread : Hc1 > Hw1(2) − Hb (>0)
[3] TL   : Hc1 < Hw1(2) + Hb
LAYER-2
[4] Tini : Hc2 < Hw2(3) − Hw2(1)
[5] TL <   : Hc2 > Hw2(1) − Hw2(3) − Hb (>0)
          Hc2 > Hw2(3) − Hw2(1) + Hb (<0)
[6] Tc1 < : Hc2 < −Hb (>0)
LAYER-3
[7] Tini : Hc3 < Hw3(4) − Hw3(2)
LAYER-4
[8] Tstor : Hc4 > −Hw4(3)
[9] Tall : Hc4 > Hw4(3)

| | a1 | a2 |
|---|---|---|
| TM | → | ⇐ |
| re | ⇐ | ⇐ |
| TM | ⇒ | ⇒ |
| re | ⇐ | ⇐ |

Hb

|  | t | Ms | Hc | Tc | Hwi | Sw |
|---|---|---|---|---|---|---|
| $Gd_{12}Dy_{12}Fe_{76}$ | 400 | 100 | 5000 | 145 | 2500 | 2 |
| $Gd_5Dy_{25}Fe_{62}Co_8$ | 450 | 80 | 1700 | 220 | 1800 | 3.3 |
| $Tb_{16}Dy_4Fe_{80}$ | 200 | 70 | 2200 | 115 | 6400 | 5.1 |
| $Tb_{27}Co_{73}$ | 2000 | 260 | 1500 | >300 | 490 | |

LAYER-1
[1] Tstor : Hc1 > Hw1(2)
[2] Tread : Hc1 > Hw1(2)
[3] TL   : Hc1 < Hw1(2) — Hb
LAYER-2
[4] Tini  : Hc2 < Hw2(3) — Hw2(1)
[5] TL <  : Hc2 > Hw2(1) — Hw2(3) — Hb (>0)
            Hc2 > Hw2(3) — Hw2(1) + Hb (<0)
[6] Tc1 < : Hc2 < —Hb (>0)
LAYER-3
[7] Tini  : Hc3 < Hw3(4) — Hw3(2)
LAYER-4
[8] Tstor : Hc4 > —Hw4(3)
[9] Tall  : Hc4 > Hw4(3)

| | t | Ms | Hc | Tc | Hw1 | Sw |
|---|---|---|---|---|---|---|
| $Tb_{27}Fe_{73}$ | 400 | 90 | 4500 | 135 | 2500 | 1.8 |
| $Gd_5Dy_{25}Fe_{62}Co_8$ | 450 | 80 | 1700 | 220 | 2100 | 3.3 |
| $Tb_{16}Dy_4Fe_{80}$ | 200 | 70 | 2200 | 115 | 6400 | |
| $Tb_{27}Co_{73}$ | 2000 | 260 | 1500 | >300 | 490 | 5.1 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL  < : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3)

Hb

FIG. 74
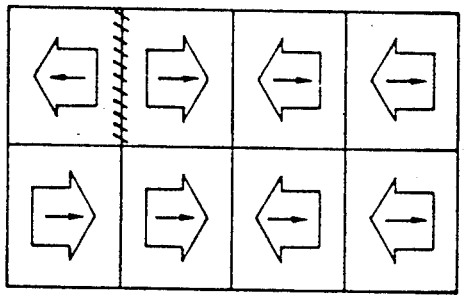
|  |  | t | Ms | Hc | Tc | Hwi | Sw |
|---|---|---|---|---|---|---|---|
| TM | $Tb_{21}Fe_{79}$ | 400 | 70 | 7000 | 135 | 3600 |  |
| TM | $Gd_5Dy_{15}Fe_{72}Co_8$ | 450 | 80 | 2000 | 220 | 2200 | 2 |
| RE | $Tb_{20}Dy_4Fe_{76}$ | 150 | 90 | 2000 | 115 | 6700 | 3.6 |
| re | $Tb_{27}Co_{73}$ | 2000 | 260 | 1500 | >300 | 520 | 5.4 |
LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) + Hb
          : Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > Hw4(3) − Hw3(2)
[9] Tall  : Hc4 > Hw4(3) + Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| RE | $Tb_{20}Dy_4Fe_{76}$ | 150 | 90 | 2000 | 115 | 7000 | 3.5 |
| re | $Tb_{27}Co_{73}$ | 2000 | 260 | 1500 | >300 | 520 | 5.4 |

LAYER-1
[1] Tstor  : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
         : Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > Hw4(3)
[9] Tall  : Hc4 > Hw4(3) + Hb Hb

FIG. 76

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| TM | $Gd_5Dy_{15}Fe_{72}Co_8$ | 450 | 80 | 2000 | 220 | 2400 | 1.8 |
| RE | $Tb_{20}Dy_4Fe_{76}$ | 150 | 90 | 2000 | 115 | 7000 | 3.5 |
| re | $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL ∨  : Hc2 > Hw2(1) − Hw2(3) + Hb
            Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{27}Co_{73}$ | 2000 | 260 | 1500 | >300 | 500 | 5.2 |

```
LAYER-1
 [1] Tstor : Hc1 > Hw1(2)
 [2] Tread : Hc1 > Hw1(2)
 [3] TL    : Hc1 < Hw1(2) - Hb
LAYER-2
 [4] Tini  : Hc2 < Hw2(3) - Hw2(1) + Hb
 [5] TL    : Hc2 > Hw2(3) - Hw2(1) + Hb
         Hc2 > Hw2(1) - Hw2(3) - Hb
 [6] Tc1  : Hc2 < Hb
LAYER-3
 [7] Tini  : Hc3 < Hw3(4) - Hw3(2) + Hb
LAYER-4
 [8] Tstor : Hc4 > Hw4(3)
 [9] Tall  : Hc4 > Hw4(3) + Hb
```

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{27}Co_{73}$ | 2000 | 260 | 1500 | >300 | 500 | 5.2 |

LAYER-1
[1] Tstor : Hc1 > Hw1(2)
[2] Tread : Hc1 > Hw1(2) + Hb
[3] TL : Hc1 < Hw1(2) + Hb
LAYER-2
[4] Tini : Hc2 < Hw2(3) − Hw2(1) + Hb
[5] TL < Hc2 > Hw2(3) − Hw2(1) + Hb
  Hc2 > Hw2(1) − Hw2(3) − Hb
[6] Tc1 < Hc2 < Hb
LAYER-3
[7] Tini : Hc3 < Hw3(4) − Hw3(2) + Hb
LAYER-4
[8] Tstor : Hc4 > Hw4(3)
[9] Tall : Hc4 > Hw4(3) + Hb

|  |  | t | Ms | Hc | Tc | Hw1 | Sw |
|--|--|--|--|--|--|--|--|
| re | $Tb_{27}Fe_{73}$ | 400 | 90 | 4500 | 135 | 2500 |  |
| RE | $Gd_5Dy_{22}Fe_{65}Co_8$ | 450 | 90 | 2000 | 230 | 1900 | 1.8 |
| RE | $Tb_{20}Dy_4Fe_{76}$ | 150 | 90 | 2000 | 115 | 7000 | 3.3 |
| re | $Tb_{27}Co_{73}$ | 2000 | 260 | 1500 | >300 | 500 | 5.2 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1) + Hb
[5] TL ∨  : Hc2 > Hw2(3) − Hw2(1) + Hb
           Hc2 > Hw2(1) − Hw2(3) − Hb
[6] Tc1 ∨ : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3) + Hb

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| re | $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > Hw4(3)
[9] Tall  : Hc4 > Hw4(3)

Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| re | $Tb_{27}Co_{73}$ | 2000 | 260 | 1500 | >300 | 480 | 5 |

```
LAYER-1
[1] Tstor : Hc1 > Hw1(2)
[2] Tread : Hc1 > Hw1(2)
[3] TL    : Hc1 < Hw1(2) - Hb
LAYER-2
[4] Tini : Hc2 < Hw2(3) - Hw2(1)
[5] TL < : Hc2 > Hw2(1) - Hw2(3) - Hb (>0)
          Hc2 > Hw2(3) - Hw2(1) + Hb (<0)
[6] Tc1 < : Hc2 < -Hb (>0)
LAYER-3
[7] Tini : Hc3 < Hw3(4) - Hw3(2)
LAYER-4
[8] Tstor : Hc4 > Hw4(3)
[9] Tall  : Hc4 > Hw4(3)
```

| | | t | Ms | Hc | Tc | Hw1 | Sw |
|---|---|---|---|---|---|---|---|
| | $Tb_{27}Fe_{73}$ | 400 | 90 | 4500 | 135 | 2500 | |
| | | | | | | | 1.8 |
| | $Gd_5Dy_{25}Fe_{62}Co_8$ | 450 | 80 | 1700 | 220 | 2100 | |
| | | | | | | | 3.3 |
| | $Tb_{20}Dy_4Fe_{76}$ | 150 | 90 | 2000 | 115 | 6300 | |
| | | | | | | | 5 |
| | $Tb_{27}Co_{73}$ | 2000 | 260 | 1500 | >300 | 480 | | re
re
RE
re

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL ∨ : Hc2 > Hw2(1) − Hw2(3) − Hb (>0)
          Hc2 > Hw2(3) − Hw2(1) + Hb (<0)
[6] Tc1 ∨ : Hc2 < −Hb (>0)
LAYER-3
[7] Tini  : Hc3 < Hw3(4) − Hw3(2)
LAYER-4
[8] Tstor : Hc4 > Hw4(3)
[9] Tall  : Hc4 > Hw4(3)

Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{23}Dy_4Fe_{73}$ | 150 | 170 | 700 | 115 | 2900 | 3.6 |
| $Tb_{27}Co_{73}$ | 2000 | 260 | 1500 | >300 | 490 | 5.1 |

```
LAYER-1
  [1] Tstor  : Hc1 > Hw1(2)
  [2] Tread  : Hc1 > Hw1(2)
  [3] TL     : Hc1 < Hw1(2) - Hb
LAYER-2
  [4] Tini   : Hc2 < Hw2(3) - Hw2(1)
  [5] TL ∨   : Hc2 > Hw2(1) - Hw2(3) + Hb
              Hc2 > Hw2(3) - Hw2(1) - Hb
  [6] Tc1 ∨  : Hc2 < Hb
LAYER-3
  [7] Tini   : Hc3 < Hw3(4) - Hw3(2)
LAYER-4
  [8] Tstor  : Hc4 > Hw4(3)
  [9] Tall   : Hc4 > Hw4(3) + Hb
```

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| re | $Tb_{23}Dy_4Fe_{73}$ | 150 | 170 | 700 | 115 | 3100 | 3.5 |
| re | $Tb_{27}Co_{73}$ | 2000 | 260 | 1500 | >300 | 490 | 5.1 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > Hw4(3)
[9] Tall  : Hc4 > Hw4(3) + Hb

|  |  | t | Ms | Hc | Tc | Hw1 | Sw |
|---|---|---|---|---|---|---|---|
| re | $Tb_{27}Fe_{73}$ | 400 | 90 | 4500 | 135 | 2500 | 1.8 |
| TM | $Gd_5Dy_{15}Fe_{72}Co_8$ | 450 | 80 | 2000 | 220 | 2400 | 3.5 |
| re | $Tb_{23}Dy_4Fe_{73}$ | 150 | 170 | 700 | 115 | 3100 | 5.1 |
| re | $Tb_{27}Co_{73}$ | 2000 | 260 | 1500 | >300 | 490 |  |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL,   : Hc2 > Hw2(1) − Hw2(3) + Hb
          : Hc2 > Hw2(3) − Hw2(1) − Hb
[6] Tc1 < : Hc2 < Hb
LAYER-3
[7] Tini  : Hc3 < Hw3(4) − Hw3(2)
LAYER-4
[8] Tstor : Hc4 > Hw4(3)
[9] Tall  : Hc4 > Hw4(3) + Hb

|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 |  |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| re | $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2)
[3] TL    : Hc1 < Hw1(2) – Hb LAYER-2
[4] Tini  : Hc2 < Hw2(3) – Hw2(1) + Hb
[5] TL ∨  : Hc2 > Hw2(3) – Hw2(1) + Hb
           Hc2 > Hw2(1) – Hw2(3) – Hb

[6] Tc1 ∨ : Hc2 < Hb

LAYER-3
[7] Tini  : Hc3 < Hw3(4) – Hw3(2) + Hb

LAYER-4
[8] Tstor : Hc4 > Hw4(3)
[9] Tall  : Hc4 > Hw4(3) + Hb

| | | t | Ms | Hc | Tc | Hwi | Sw |
|---|---|---|---|---|---|---|---|
| RE | $Gd_{12}Dy_{12}Fe_{76}$ | 400 | 100 | 5000 | 145 | 2500 | |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| re | $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1) − Hb
[5] TL <  : Hc2 > Hw2(3) − Hw2(1) + Hb
         : Hc2 > Hw2(1) − Hw2(3) − Hb
[6] Tc1 < : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{22}Fe_{65}Co_8$ | 450 | 90 | 2000 | 230 | 1900 | 1.8 |
| $Tb_{23}Dy_4Fe_{73}$ | 150 | 170 | 700 | 115 | 3300 | 3.3 |
| $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2) + Hb
[3] TL     : Hc1 < Hw1(2) + Hb LAYER-2
[4] Tini : Hc2 < Hw2(3) − Hw2(1) + Hb
[5] TL ∨ : Hc2 > Hw2(3) − Hw2(1) + Hb
          Hc2 > Hw2(1) − Hw2(3) − Hb
[6] Tc1 ∨ : Hc2 < Hb LAYER-3
[7] Tini : Hc3 < Hw3(4) − Hw3(2) + Hb LAYER-4
[8] Tstor : Hc4 > Hw4(3)
[9] Tall : Hc4 > Hw4(3) + Hb

| | a1 | a2 | |
|---|---|---|---|
| re | ← | ⇒ | |
| RE | ⇐ | ⇐ | |
| re | ⇐ | ← | |
| re | ⇐ | ← | |

Hb

| TM | | | t | Ms | Hc | Tc | Hw1 | Sw |
|---|---|---|---|---|---|---|---|---|
| re | $Tb_{21}Fe_{79}$ | | 400 | 70 | 7000 | 135 | 3600 | |
| re | $Gd_5Dy_{25}Fe_{62}Co_8$ | | 450 | 80 | 1700 | 220 | 1800 | 2 |
| re | $Tb_{23}Dy_4Fe_{73}$ | | 150 | 170 | 700 | 115 | 3300 | 3.3 |
| re | $Tb_{27}Co_{73}$ | | 2000 | 260 | 1500 | >300 | 480 | 5 |

```
LAYER-1
[1] Tstor : Hc1 > Hw1(2)
[2] Tread : Hc1 > Hw1(2) - Hb (>0)
[3] TL    : Hc1 < Hw1(2) + Hb
LAYER-2
[4] Tini  : Hc2 < Hw2(3) - Hw2(1)
[5] TL <  : Hc2 > Hw2(1) - Hw2(3) - Hb (>0)
          : Hc2 > Hw2(3) - Hw2(1) + Hb (<0)
[6] Tc1 < : Hc2 > -Hb (>0)
LAYER-3
[7] Tini  : Hc3 < Hw3(4) - Hw3(2)
LAYER-4
[8] Tstor : Hc4 > Hw4(3)
[9] Tall  : Hc4 > Hw4(3)
```

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2)
[3] TL : Hc1 < Hw1(2) − Hb LAYER-2
[4] Tini : Hc2 < Hw2(3) − Hw2(1)
[5] TL < : Hc2 > Hw2(1) − Hw2(3) − Hb (>0)
　　　　　Hc2 > Hw2(3) − Hw2(1) + Hb (<0)

[6] Tc1 < : Hc2 < −Hb (>0)

LAYER-3
[7] Tini : Hc3 < Hw3(4) − Hw3(2)

LAYER-4
[8] Tstor : Hc4 > Hw4(3)
[9] Tall : Hc4 > Hw4(3)

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{25}Fe_{62}Co_8$ | 450 | 80 | 1700 | 220 | 2100 | 1.8 |
| $Tb_{23}Dy_4Fe_{73}$ | 150 | 170 | 700 | 115 | 3300 | 3.3 |
| $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2)
[3] TL : Hc1 < Hw1(2) − Hb LAYER-2
[4] Tini : Hc2 < Hw2(3) − Hw2(1)
[5] TL : Hc2 > Hw2(1) − Hw2(3) − Hb (>0)
        Hc2 > Hw2(3) − Hw2(1) + Hb (<0)
[6] Tc1 < : Hc2 < −Hb (>0)

LAYER-3
[7] Tini : Hc3 < Hw3(4) − Hw3(2)

LAYER-4
[8] Tstor : Hc4 > Hw4(3)
[9] Tall : Hc4 > Hw4(3)

FIG. 93
(1) Tc2 < Thigh
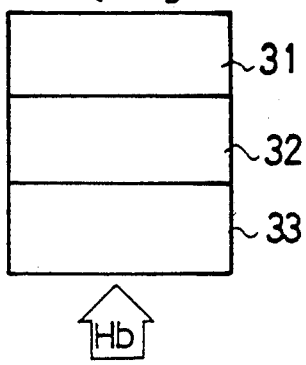
(2)
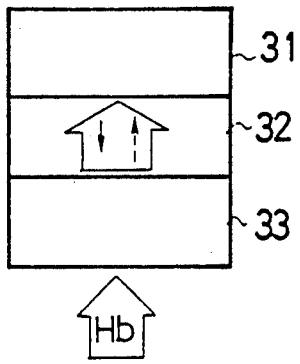
(3)
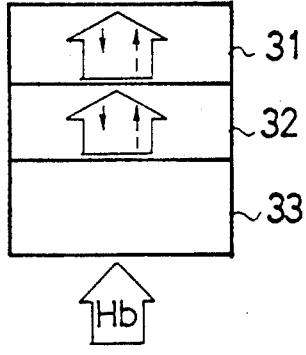
(4)
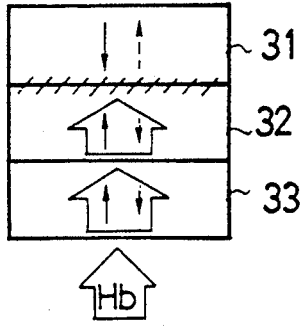
(5)
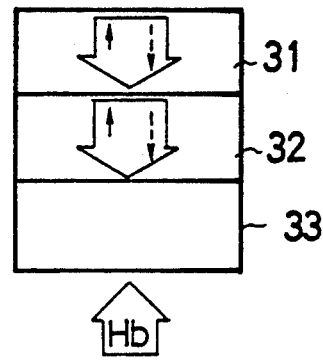
(6)
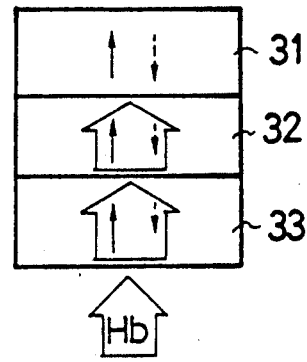

FIG. 99(a) (PRIOR ART)
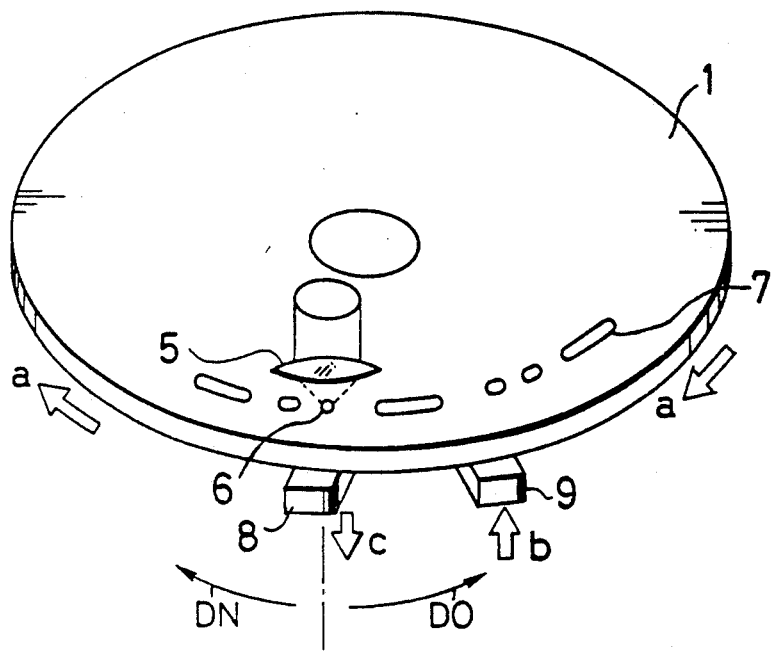
FIG. 99(b) (PRIOR ART)
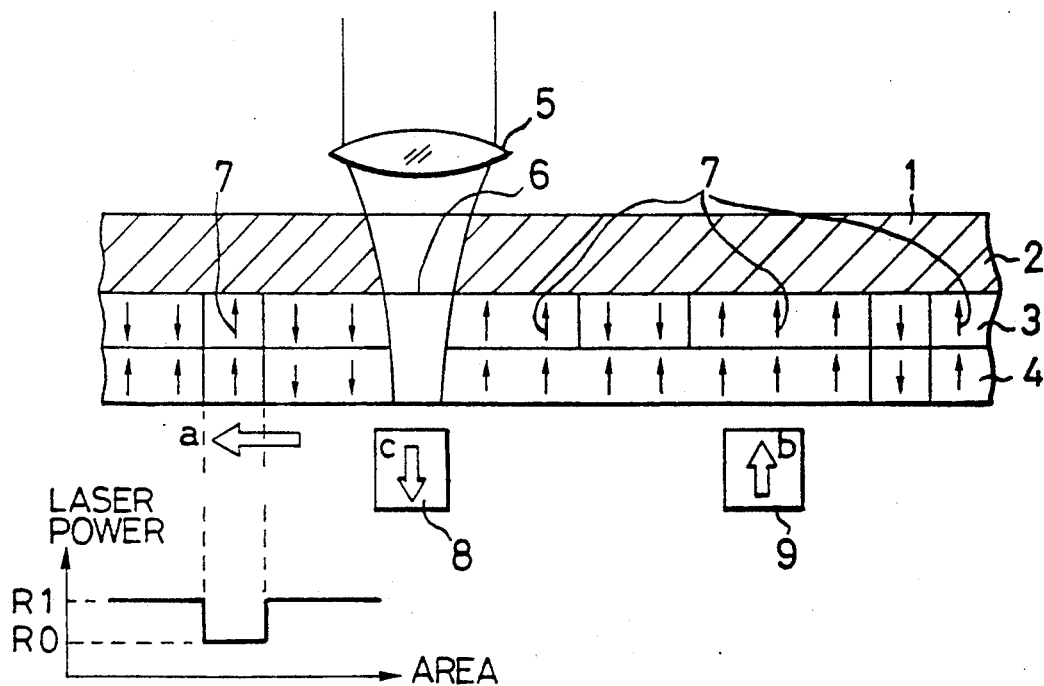
FIG. 99(c) (PRIOR ART)

MAGNETO-OPTIC RECORDING MEDIUM AND MANUFACTURING METHOD

TECHNICAL FIELD

This invention relates to a magneto-optic recording medium that is directly overwritable by optical modulation, enabling new information to be written directly over old information, and to a manufacturing method for this magneto-optic recording medium.

BACKGROUND ART

In FIG. 99, (a) is an oblique view of the main parts of a prior-art magneto-optic read-write device as shown, for example, in *Preprints of the 34th Joint Congress of Applied Physics*, Spring 1987, 28 P-Z L-3; (b) is a sectional view illustrating optical reading and writing of the recording medium; and (c) is a plot of the laser power variations for writing information in areas on the recording medium. In these drawings, 1 is a magneto-optic recording medium comprising a glass or plastic substrate 2, a first magnetic layer 3, and a second magnetic layer 4. An exchange coupling force acts between the first and second magnetic layers 3 and 4, tending to align their magnetization in the same direction. A laser beam is focused by an objective lens 5 onto a spot 6 on the information medium 1. The numeral 7 indicates areas in which the direction of magnetization in the first magnetic layer 3 is upward in FIG. 99 (b), this indicating the recording of binary "1" data. An initializing magnet 9 generates a magnetic field of substantially 5000 oersteds to initialize the second magnetic layer 4. A bias magnet 8 disposed facing the objective lens 5 with the information medium 1 in between generates a magnetic field of substantially 200 to 600 oersteds. In FIG. 99 (c) laser power is shown on the vertical axis and areas are indicated on the horizontal axis. The laser power is modulated to record the information "1" in the region R1 and the information "0" in the region R0. The dash-dot line in FIG. 99 (a) separates new data (DN) on the left from old data (DO) on the right.

The operation will be explained next. The recording medium 1 is rotated in the direction of the arrows in FIG. 99 (a) and (b) by a support and driving mechanism not shown in the drawing. The first magnetic layer 3 has the same properties as the recording layer in the media used in general magneto-optic disks comprising, for example, $Tb_{21}Fe_{79}$, and here too it functions as a reading and writing layer. The second magnetic layer 4, called the auxiliary layer, comprises $Gd_{24}Tb_3Fe_{73}$, for example, and provides the overwrite function, enabling new information to be written over old information in real time. The Curie temperatures Tc1 and Tc2 of the first and second magnetic layers 3 and 4, their room-temperature coercivities Hc1 and Hc2, and their room-temperature exchange coupling strengths Hw1 and Hw2 satisfy the following relations:

$$Tc1 < Tc2$$

$$Hc1 - Hw1 > Hc2 - Hw2$$

First the reading of information recorded in the first magnetic layer 3 (the recording layer) will be explained. As shown in FIG. 99 (b), the first magnetic layer 3 is magnetized in the up direction to represent a "1" and in the down direction to represent a "0." When this information is read, the first magnetic layer 3 is illuminated by the beam spot 6, and the magnetic orientation of the first magnetic layer 3 in the beam spot 6 is transformed by the well-known optical Kerr effect to optical information, in which form it is detected. FIG. 100 indicates the temperature changes in the magnetic layers in the spot caused by the laser beam power, with A corresponding to the intensity of the laser beam that illuminates the recording medium 1 during reading. At this intensity the maximum temperature increase in the first and second magnetic layers 3 and 4 in the beam spot 6 does not attain the Curie temperatures Tc1 and Tc2 of these layers, so the illumination in the beam spot does not erase the direction of magnetization; that is, it does not erase the recorded information.

Next the overwriting operation will be explained. The initializing magnet 9 in FIG. 99 generates a magnetic field of intensity Hini in the direction of the arrow b (up) in the drawing. This field Hini is related to the coercivity and exchange coupling strength of the first and second magnetic layers 3 and 4 as follows:

$$Hc1 - Hw1 > Hini > Hc2 + Hw2$$

As a result, when the information medium 1 revolves in the direction of the arrow a in FIG. 99 (b), those parts of the second magnetic layer 4 that pass over the initializing magnet 9 are uniformly magnetized in the up direction, regardless of the magnetic alignment of the first magnetic layer 3. The first magnetic layer 3 itself is not affected at room temperature by the magnetic field of the initializing magnet or by the exchange coupling force exerted by the second magnetic layer 4, so it remains in its previous state.

To write a "1," which means to magnetize the first magnetic layer 3 in the up direction, the laser beam is modulated to the intensity B in FIG. 100. The temperature in the beam spot 6 then rises above the Curie temperature Tc1 of the first magnetic layer 3, but does not reach the Curie temperature Tc2 of the second magnetic layer4. Consequently, the first magnetic layer 3 loses its magnetization, while the second magnetic layer 4 retains the upward magnetic alignment given by the initializing magnet 9. As the disk turns and the area leaves the illumination of the beam spot 6, when the temperature of the first magnetic layer 3 falls below its Curie temperature Tc1, the magnetic alignment of the second magnetic layer 4 is transferred to the first magnetic layer 3, so that the first magnetic layer 3 becomes magnetized in the up direction, corresponding to a "1."

To record a "0," which means to magnetize the first magnetic layer 3 in the down direction, the laser beam is modulated to the intensity C in FIG. 100. The temperature in the beam spot 6 then rises above both the Curie temperature Tc1 of the first magnetic layer 3 and the Curie temperature Tc2 of the second magnetic layer 4. Consequently, the first and second magnetic layers 3 and 4 both lose their magnetization. As the disk turns and the area leaves the illumination of the beam spot 6, when the temperature of the second magnetic layer 4 falls below its Curie temperature Tc2, the second magnetic layer 4 is magnetized in the down direction by the weak magnetic field applied in the direction of the arrow c (down) in FIG. 99 by the bias magnet 9. Moreover, when the temperature of the first magnetic layer 3 falls below its Curie temperature Tc1, the magnetic alignment of the second magnetic layer 4 is transferred to the first magnetic layer 3, so that the first magnetic layer 3 becomes magnetized in the down direction, corresponding to a "0."

By the above overwriting operations, new information can be written over old information in real time by modulating the laser beam power between the values B and C in FIG. 100 according to the binary codes "0" and "1" of the new information. Since the prior-art magneto-optic recording medium is structured as above, however, it has the problems that an initializing magnet with a strong magnetic field is required and the overall structure of the readwrite apparatus is complex and large in size.

The present invention is directed toward a solution of such problems, an object being to obtain a magneto-optic recording medium that does not require an initializing magnet and can be easily overwritten. Another object is to provide a fabrication method for such a magneto-optic recording medium.

Disclosure of Invention

The invention of claim 1 is a magneto-optic recording medium comprising a first magnetic layer having perpendicular magnetic anisotropy and a second magnetic layer provided on the first magnetic layer and coupled to it by an exchange force, wherein the following relationship is satisfied:

$$Tc1 < Tc2$$

where,
 Tc1: Curie temperature of first magnetic layer
 Tc2: Curie temperature of second magnetic layer
The following relationship is additionally satisfied at room temperature:

$$Hc1 > Hw1 \text{ and } Hc2 > Hw2$$

where,
 Hc1: coercivity of first magnetic layer
 Hc2: coercivity of second magnetic layer
 Hw1: reversal field shift in first magnetic layer due to exchange force
 Hw2: reversal field shift in second magnetic layer due to exchange force.

The invention of claim 2 is a magneto-optic recording medium comprising a first magnetic layer having perpendicular magnetic anisotropy, a second magnetic layer provided on the first magnetic layer and coupled to it by an exchange force, and a third magnetic layer provided on the second magnetic layer and coupled to it by an exchange force, wherein the following relationships are satisfied:

$$Tc1 < Tc2 < Tc3$$

where,
 Tc1: Curie temperature of first magnetic layer
 Tc2: Curie temperature of second magnetic layer
 Tc3: Curie temperature of third magnetic layer
The following relationships are additionally satisfied at room temperature:

$$Hc1 > Hw1(2) \text{ and } Hc3 > Hw3(2)$$

There exists a temperature between room temperature and Tc1 at which the following relationship is also satisfied:

$$Hc2 < Hw2(3) - Hw2(1)$$

where,
 Hc1: coercivity of first magnetic layer
 Hc2: coercivity of second magnetic layer
 Hc3: coercivity of third magnetic layer
 Hwi(j): reversal field shift in i-th layer due to exchange coupling force between j-th layer and i-th layer.

The invention of claim 3 is a magneto-optic recording medium comprising a first magnetic layer having perpendicular magnetic anisotropy, a second magnetic layer provided on the first magnetic layer and coupled to it by an exchange force, a third magnetic layer provided on the second magnetic layer and coupled to it by an exchange force, and a fourth magnetic layer provided on the third magnetic layer and coupled to it by an exchange force, wherein the following relationships are satisfied:

$$Tc1 < Tc2, Tc3 < Tc2, Tc1 < Tc4, \text{ and } Tc3 < Tc4$$

where,
 Tc1: Curie temperature of first magnetic layer
 Tc2: Curie temperature of second magnetic layer
 Tc3: Curie temperature of third magnetic layer
 Tc4: Curie temperature of fourth magnetic layer
The following relationships are additionally satisfied at room temperature:

$$Hc1 > Hw1(2) \text{ and } Hc4 > Hw4(3)$$

There exists a temperature between room temperature and Tc1 or Tc3, whichever is lower, at which the following relationships are also satisfied:

$$Hc2 < Hw2(3) - Hw2(1) \text{ and}$$
$$Hc3 < Hw3(4) - Hw3(2)$$

where,
 Hc1: coercivity of first magnetic layer
 Hc2: coercivity of second magnetic layer
 Hc3: coercivity of third magnetic layer
 Hc4: coercivity of fourth magnetic layer
 Hwi(j): reversal field shift in i-th layer due to exchange coupling force between j-th layer and i-th layer.

The invention of claim 4 is the magneto-optic recording medium of claim 3, where $Tc2 \leq Tc4$.

The invention of claim 5 is a magneto-optic recording medium comprising a first magnetic layer having perpendicular magnetic anisotropy, a second magnetic layer provided on the first magnetic layer and coupled to it by an exchange force, and a third magnetic layer provided on the second magnetic layer and coupled to it by an exchange force, wherein the following relationships are satisfied:

$$Tc1 < Tc2 \text{ and } Tc3 < Tc2$$

where,
 Tc1: Curie temperature of first magnetic layer
 Tc2: Curie temperature of second magnetic layer
 Tc3: Curie temperature of third magnetic layer
The following relationships are additionally satisfied at room temperature:

$$Hc1 > Hw1(2) \text{ and } Hc3 > Hw3(2)$$

There exists a temperature between room temperature and Tc3 at which the following relationship is also satisfied:

$$Hc2 < Hw2(3) - Hw2(1)$$

where,
- Hc1: coercivity of the first magnetic layer
- Hc2: coercivity of the second magnetic layer
- Hc3: coercivity of the third magnetic layer
- Hwi(j): reversal field shift in i-th layer due to exchange coupling force between j-th layer and i-th layer.

The invention of claim 6 is the magneto-optic recording medium of claim 5, where $Tc3 \leq Tc2$.

The invention of claim 7 is the magneto-optic recording medium of claim 5, further comprising a fourth magnetic layer disposed between the second and third magnetic layers and coupled to them by an exchange force, wherein the following relationships are satisfied:

$$Tc4 < Tc3 < Tc2 \text{ and } Tc1 < Tc2$$

where,
Tc4: Curie temperature of the fourth magnetic layer

The following relationships are additionally satisfied at room temperature:

$$Hc1 > Hw1(2) \text{ and } Hc3 > Hw3(4)$$

There exists a temperature between room temperature and Tc4 at which the following relationships are also satisfied:

$$Hc2 < Hw2(4) - Hw2(1) \text{ and}$$
$$Hc4 < Hw4(3) - Hw4(2)$$

The invention of claim 8 is the magneto-optic recording medium described in any of claims 1 to 7, having an interface control layer disposed at an interface between magnetic layers, for controlling the exchange force.

The invention of claim 9 is a method of manufacturing an overwritable magneto-optic recording medium having an initializing layer the magnetization of which is not reversed in reading or writing, wherein a substrate comprising the aforesaid initializing layer is placed in an atmosphere to which a magnetic field oriented in one direction is applied by a magnetic field applying means, the surface of the substrate being substantially perpendicular to the direction in which the magnetic field is applied, thereby pre-initializing the initializing layer.

The invention of claim 10 is a method of manufacturing an overwritable magneto-optic recording medium having initializing layers the magnetization of which is not reversed in reading or writing, wherein substrates comprising the aforesaid initializing layers are placed in an atmosphere to which a magnetic field oriented in one direction is applied by a magnetic field applying means, the surface of the substrates being substantially perpendicular to the direction in which the magnetic field is applied, thereby pre-initializing the initializing layers, after which the substrates are joined.

The invention of claim 11 is a method of manufacturing an overwritable magneto-optic recording medium having initializing layers the magnetization of which is not reversed in reading or writing, wherein after the joining of substrates having initializing layers, the joined substrates are placed in an atmosphere to which a magnetic field oriented in one direction is applied, the surfaces of the joined substrates being substantially perpendicular to the direction in which the magnetic field is applied.

The invention of Claim 12 is a method of manufacturing an overwritable magneto-optic recording medium having initializing layers the magnetization of which is not reversed in reading or writing, wherein after the joining of two substrates having initializing layers with different coercivities, a magnetic field stronger than the coercivity of one of the initializing layers is applied substantially perpendicular to the substrates, then a magnetic field weaker than the coercivity of the aforesaid one of the initializing layers but stronger than the coercivity of the other initializing layer and oriented oppositely to the aforesaid magnetic field is applied substantially perpendicular to the substrates.

The inventive structures in the preceding claims 1 through 8 are magneto-optic recording media having a first magnetic layer for information recording and an initializing layer, which enable optically-modulated overwriting. Further auxiliary layers can be provided for more efficient transfer from the initializing layer to the recording layer. Claims 9 through 12 relate to methods of applying a magnetic field exceeding the coercivity of the initializing layer to pre-initialize the magnetic alignment of the initializing layer of the magneto-optic recording medium to a certain direction.

BRIEF DESCRIPTION OF DRAWINGS

FIG. 1 (a) is an oblique view of the main parts of a magneto-optic recording apparatus comprising an inventive magneto-optic recording medium, (b) is a partial sectional view illustrating optical reading and writing of an inventive two-layer magneto-optic recording medium, and (c) is a plot of laser power variations for recording information in areas on the magneto-optic recording medium.

FIG. 4 shows the states of the layers of an inventive two-layer magneto-optic recording medium during the writing of information.

FIG. 10 illustrates the states of the layers of an inventive four-layer magneto-optic recording medium during the writing of information.

FIGS. 11 through 91 illustrate the conditions of inventive four-layer magneto-optic recording media having layers of different compositions.

FIG. 93 shows the states of the layers of another inventive three-layer magneto-optic recording medium during recording.

FIG. 99 (a) is an oblique view of the main parts of a prior-art magneto-optic read-write apparatus, (b) is a partial sectional view illustrating optical reading and writing of the magneto-optic recording medium, and (c) is a plot of laser power variations for recording information in areas on the magneto-optic recording medium.

BEST MODE OF CARRYING OUT THE INVENTION

Figure 2:
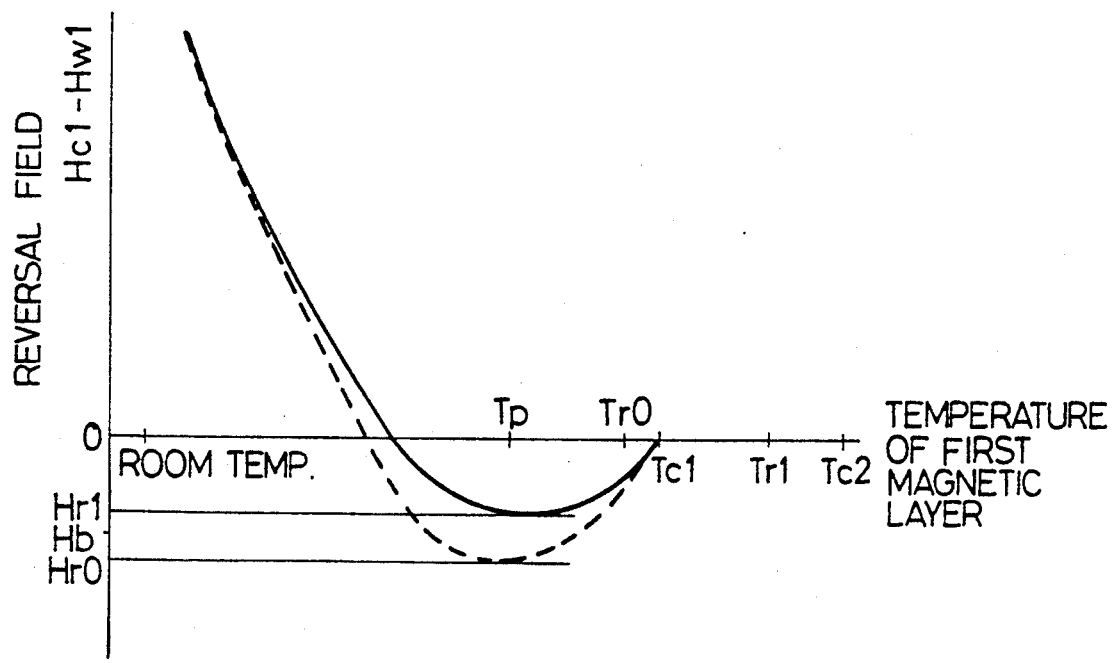
FIG. 2 is a drawing illustrating the relationship between the temperature in the first magnetic layer of an inventive two-layer magneto-optic recording medium and the reversal field.

A detailed description will be given of an overwritable magneto-optic recording medium that does not require an initializing magnet. In FIG. 1, (a) is an oblique view of the main parts of a magneto-optic recording apparatus comprising an inventive magneto-optic recording medium, (b) is a partial sectional view illustrating optical reading and writing of an inventive two-layer magneto-optic recording medium, and (c) is a plot of laser power variations for recording information in areas on the inventive magneto-optic recording medium. In these drawings, 11 is an inventive magneto-optic recording medium, 20 is a laser beam emitted by a beam-emitting device for illuminating the magneto-optic recording medium 11 and reading and writing information, 16 is a beam spot formed by focusing the laser beam 20 with an objective lens 5 so as to illuminate the magneto-optic recording medium 11, and 18 is a magnet that applies a magnetic field in a fixed direction to the part of the magneto-optic recording medium 11 illuminated by the beam emitting device. The magneto-optic recording medium 11 is rotationally driven in the direction of the arrow (a) in the drawings. As noted above, the information medium 11 comprises two magnetic layers 13 and 14, the first magnetic layer 13 being closer than the second magnetic layer 14 to the side illuminated by the laser beam. The first magnetic layer 13 is a read-write layer for holding directions of magnetization representing the information "0" and "1.". The second magnetic layer 14 is provided for overwriting. The second magnetic layer 14 is called the initializing layer, and provides the functions of both the auxiliary layer and the initializing magnet in the prior art.

The characteristics of the first magnetic layer 13 and the second magnetic layer 14 are related so that $Tc1 < Tc2$, where $Tc1$ and $Tc2$ are their respective Curie temperatures, and so that $$Hc1 > Hw1 + Hb \quad (A)$$

$$Hc2 > Hw2 + Hb \quad (B)$$

where $Hc1$ and $Hc2$ are their respective coercivities, and $Hwi$ ($i=1, 2$) represents the exchange coupling forces between the two layers.

Equation (A) holds from room temperature to a certain temperature T0 lower than $Tc1$. Thus in the temperature range from room temperature to T0, the coercivity $Hc1$ of the first magnetic layer 13 is greater than the sum of the effect $Hw1$ of the exchange coupling force and the field $Hb$ applied by the magnet 18 during writing, hence the first magnetic layer 13 is able to preserve its magnetic alignment without being affected by the magnetization of the second magnetic layer 14.

Equation (B) holds throughout the range of operating temperatures. Accordingly, in the range of operating temperatures, the coercivity $Hc2$ of the second magnetic layer 14 is greater than the sum of the effect $Hw2$ of the exchange coupling force and the field $Hb$ applied by the magnet 18 during writing, hence once the first magnetic layer 13 is initialized, to the up direction as shown in FIG. 1 (b) for example, it is able to preserve its upward magnetic alignment without suffering magnetic reversal.

FIG. 2 shows the temperature characteristic of the reversal field of the first magnetic layer 13. The reversal field, which is the minimum magnetic field necessary to reverse the magnetic alignment, is given by the formula:

$$Hc1 - Hw1$$

The solid line in FIG. 2 indicates the temperature characteristic of the reversal field when the laser intensity is R1 in FIG. 1 (c). The dashed line indicates the characteristic when the laser intensity is R0.

Next the writing operation will be explained. First the operation of writing the information "0" by magnetizing the first magnetic layer 13 in the down direction will be described.

When the laser intensity is R1, the temperature in the illuminated beam spot 16 rises to Tr1 in FIG. 2. As the disk rotates and leaves the illuminated beam spot 16, the temperature in the first magnetic layer 13 falls. As can be seen from the solid line in FIG. 2, throughout the temperature range from Tc1 to room temperature.

$$|Hb| > Hw1 - Hc1.$$

so the first magnetic layer 13 is magnetized in the downward direction of the bias magnetic field Hb.

Next the operation of writing the information "1" by magnetizing the first magnetic layer 13 in the up direction will be described.

When the laser intensity is R0, the temperature in the illuminated beam spot 16 rises to Tr0 in FIG. 2. As the disk rotates and leaves the illuminated beam spot 16, the temperature in the first magnetic layer 13 falls. As can be seen from the dashed line in FIG. 2, in the neighborhood of, for example, the temperature Tp, $$|Hb| < Hw1 - Hc1,$$

so the first magnetic layer 13 is magnetized in the direction of the exchange force, namely the upward direction in which the second magnetic layer 14 is magnetized.

By the above operations, new data can be written over old data in real time by modulating the intensity of the laser beam at each point in FIG. 4 between R1 and R0, according to the "0" and "1" values of the new data.

Next the reason why the reversal field of the first magnetic layer 13 changes with temperature as shown by the solid line in FIG. 2 when the laser intensity is R0 and R1 will be explained.

Laser illumination raises the temperatures of both magnetic layers, but after being heated, the first magnetic layer 13 cools at a faster rate than the second magnetic layer 14. This is thought to occur for the following reasons.

(i) Since the laser illumination is from the side of the first magnetic layer 13, the first magnetic layer 13 is heated to a higher temperature than the second magnetic layer 14. Its rate of cooling is therefore faster. (ii) The first magnetic layer 13 is in contact with the substrate, and dissipates heat through the substrate. (iii) The extreme thinness of the first magnetic layer 13 leads to large heat dissipation.

Thus the first magnetic layer 13 cools at a faster rate. Let T2r0 be the temperature of the second magnetic layer 14 when the first magnetic layer 13 cools to a temperature of substantially Tp in FIG. 2 after having been heated by a laser beam of intensity R0 to a temperature of Tr0 in FIG. 2. Let T2r1 be the temperature of the second magnetic layer 14 when the first magnetic layer 13 cools to a temperature of substantially Tp in FIG. 2 after having been heated by a laser beam of intensity R1 to a temperature of Tr1 in FIG. 2. From the foregoing difference in cooling rates, it follows that:

T2r0 < T2r1

The higher laser intensity R1 therefore leaves the second magnetic layer 14 at a higher temperature in the vicinity of Tp. Since the exchange coupling force tends to decrease at higher temperatures of the magnetic layers, the exchange coupling force is smaller when the laser beam has the higher intensity R1. This gives rise to the difference between the solid line and dashed line in the temperature characteristics of the reversal field of the first magnetic layer 13 in FIG. 2. A result is a magnetic hysteresis effect with respect to temperature which makes overwriting possible.

The operation of reading the recorded information is the same as in the prior art.

Next an embodiment will be described in which the first and second magnetic layers comprise an alloy of rare-earth (RE) and transition-metal (TM) elements.

When an RE-TM alloy is selected for both the first and second magnetic layers, the direction and magnitude of the externally observable magnetization of each alloy depends on the direction and magnitude of the magnetization (magnetic moment per unit volume) of its TM and RE sublattices. Let the magnetic direction and magnitude of the TM sublattice be represented by a dotted line vector ↑, the magnetic direction and magnitude of the RE sublattice by a solid-line vector ↑, and the magnetic direction and magnitude of the alloy as a whole by a double-line vector ⇑. The vector ⇑ is expressed as the sum of the vector ↑ and the vector ↑. Due to an interaction between the TM sublattice magnetization and the RE sublattice magnetization in the alloy, the vector ↑ and the vector ↑ always point in opposite directions. When both are equal in magnitude, the sum of ↓ and ↑ or ↑ and ↓ is zero, so the magnetization of the alloy is zero (that is, the magnitude of the externally apparent magnetization is zero). The alloy composition that produces this zero value is called the compensation composition. At other compositions, the alloy has a magnetization equal in strength to the difference in strength between the two sublattice magnetizations, oriented ( or ) in the direction of the stronger vector. The magnetization of this vector is externally observable. For example, ↑ and ↓ gives ⇑, and ↑ and ↓ gives ⇓.

When the strength of the RE sublattice magnetization vector exceeds the strength of the TM sublattice magnetization vector, the alloy is said to be RE-rich, and when the strength of the TM sublattice magnetization vector exceeds the strength of the RE sublattice magnetization vector, the alloy is said to be TM-rich. The compositions of the first and second magnetic layers can both be classified as RE-rich or TM-rich.

Figure 3:
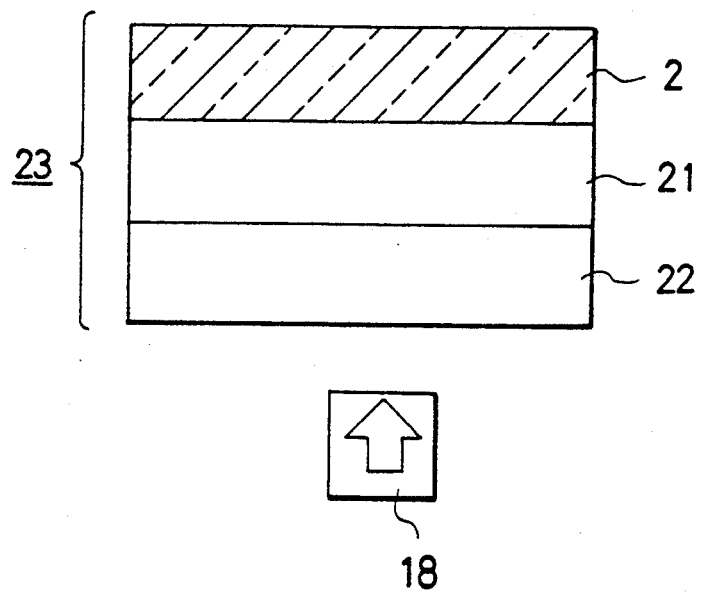
FIG. 3 is a drawing showing the specific structure of an inventive two-layer magneto-optic recording medium.

FIG. 3 is a sectional view of a magneto-optic recording medium comprising such RE-TM alloys, in which 2 is the substrate, 21 is a first amorphous magnetic alloy layer of MFeCo (in which M represents Tb or Dy or a combination of both), and 22 is a second amorphous magnetic alloy layer of GdTbFe. A non-magnetic substance such as glass or plastic is used for the substrate 2. The MFeCo ternary first amorphous magnetic alloy layer 21 (which will be called the first magnetic alloy layer) has a composition of $M_x(Fe_{1-y}Co_y)_{1-x}$, where $0.15 < X < 0.3$ and $0 < y \leq 0.50$. The second amorphous magnetic alloy layer 22 (which will be called the second magnetic alloy layer) has a composition of $(Gd_{1-y}Tb_y)_x Co_{1-x}$, where $0.15 < X < 0.35$ and $0.3 \leq y \leq 1$. Magnetic layers such as the above can be formed by methods such as sputtering or vacuum evaporation deposition.

Embodiments of the invention will now be described in detail.

Embodiment 1

Ferrimagnetic layers as follows are formed on a substrate by sputtering.

| 1st magnetic alloy layer: | $Tb_{23}Fe_{72}Co_5$ | 500 angstroms |
| 2nd magnetic alloy layer: | $Gd_{14}Tb_{14}Co_{72}$ | 1500 angstroms |

The magnetic layers are coupled by an exchange force. The Curie temperature of the first magnetic alloy layer 21 is substantially 180° C. The second magnetic alloy layer 22 has a reversal field of 1000 oersteds or more from room temperature to 250° C., so the second magnetic alloy layer 22 does not undergo magnetic reversal within the operating temperature range. At a temperature of substantially 150° C. the exchange force exceeds the coercivity of the first magnetic alloy layer 21, the difference between the exchange force and the coercivity reaching a maximum value of substantially 1000 oersteds. The external magnet 18 generates a constant magnetic field of substantially 1000 oersteds oriented in the up direction. The second magnetic alloy layer 22 is magnetized uniformly in the up direction. The direction of the magnetic field generated by the external magnet 18 is opposite to that shown in the preceding example.

Figure 5:
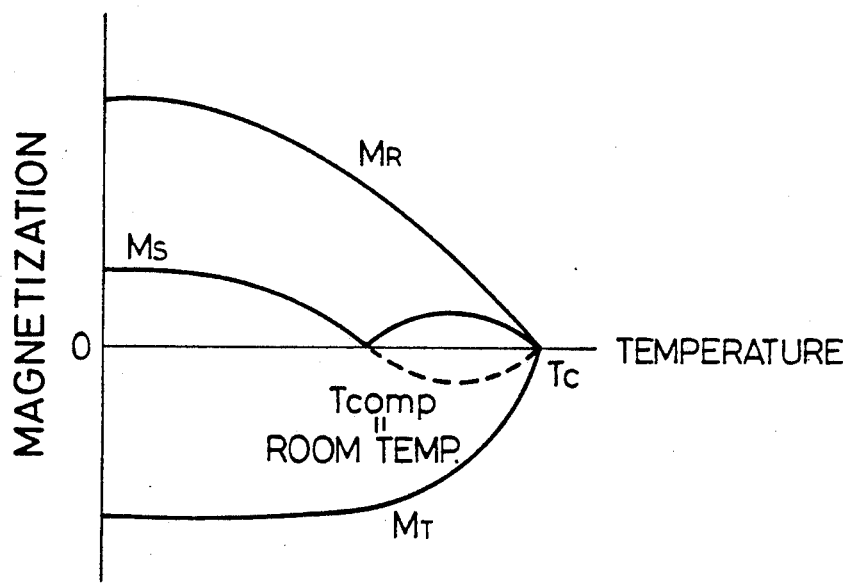
FIG. 5 illustrates the magnetization states of an alloy of a rare-earth metal and transition metal having a room-temperature compensation temperature.

The writing of information on a magneto-optic recording medium 23 of this composition will be explained with reference to FIG. 4. As shown at (1) or (5) in FIG. 4, the composition of the first magnetic alloy layer of $Tb_{23}Fe_{72}Co_5$ is the compensation composition at room temperature, so the net magnetization of the alloy is zero. The second magnetic alloy layer of $Gd_{14}Tb_{14}Co_{72}$ is RE-rich and has a net magnetization in the up direction. In this embodiment, a "0" is recorded when the direction of magnetization of the TM sublattice of the first magnetic alloy layer 21 is down, and a "1" is recorded when the direction is up. The writing of a "1" is shown at (1) to (4) in FIG. 4. First, when a domain is illuminated by a laser beam spot of intensity R1 [see (c) in FIG. 1], its temperature rises to Tr1, exceeding the Curie temperature of the first magnetic alloy layer 21, so the first magnetic alloy layer 21 is demagnetized [(2) in FIG. 4]. When the rotation of the disk carries the domain out of the beam spot, the temperature of the first magnetic alloy layer falls. Hw1−Hc1 reaches a maximum in the vicinity of Tp in FIG. 2, but the bias field Hb exceeds this value ($|Hb| > Hw1−Hc1$), so the first magnetic alloy layer receives a net magnetization in the (up) direction of the bias field Hb. At this temperature, the first magnetic alloy layer is TM-rich. This is because, from FIG. 5, the compensation point is close to room temperature, making the alloy TM-rich at higher temperatures. Accordingly, the TM sublattice is magnetized in the up direction [(3) in FIG. 4]. When the temperature falls further to room temperature, the first magnetic alloy layer has the compensation composition [(4) in FIG. 4]. The recording of a "0" is shown at (5) to (8) in FIG. 4. First, when a domain is illuminated by a laser beam spot of intensity R0, its temperature rises to Tr0, [(6) in FIG. 4]. When the rotation of the disk carries the domain out of the beam spot, the temperature of the first magnetic alloy layer falls. As explained previously, in the vicinity of Tp in FIG. 2 (substantially 150° C.), the magnetic alignment of the second magnetic alloy layer is transferred by the exchange force to the first magnetic alloy layer (Hb<Hw1−Hc1), so the TM sublattice of the first magnetic alloy layer is magnetized in the down direction. [(7) in FIG. 4]. When the temperature falls further to room temperature, the first magnetic alloy layer has the compensation composition [(8) in FIG. 4]. Optically modulated direct overwriting is thus possible by modulating only the intensity of the laser beam. When a signal was recorded in this way with a linear speed of 6 m/s and pit length of 0.8 to 5 micrometers, the field generated by the external magnet 18 being 1000 oersteds and the laser beam being modulated between a peak power of 16 mW and bottom power of 5 mW, an erasability characteristic of 25 dB or greater was obtained. The signal was read with a laser power of 1.5 mW.

Embodiments 2 to 8

It suffices for the coercivity of the second magnetic layer 14 to have a sufficiently large magnitude in the vicinity of the Curie temperature of the first magnetic layer 13. The magneto-optic information recording media shown in Table 1 were obtained by sputtering magnetic layers on a glass substrate by the same method as in the first embodiment.

TABLE 1

| | 1ST MAGNETIC LAYER | | 2ND MAGNETIC LAYER | |
|---|---|---|---|---|
| | COMPOSITION | THICKNESS Å | COMPOSITION | THICKNESS Å |
| MEDIUM 2 | $Tb_{23}Fe_{72}Co_5$ | 500 | $Gd_{15}Tb_{14}Co_{71}$ | 1500 |
| MEDIUM 3 | $Tb_{23}Fe_{72}Co_5$ | 400 | $Gd_{14}Tb_{14}Co_{72}$ | 1500 |
| MEDIUM 4 | $Tb_{23}Fe_{72}Co_5$ | 400 | $Gd_{14}Tb_{16}Co_{70}$ | 1500 |
| MEDIUM 5 | $Tb_{23}Fe_{72}Co_5$ | 500 | $Gd_{14}Tb_{14}Co_{72}$ | 1800 |
| MEDIUM 6 | $Tb_{23}Fe_{72}Co_5$ | 400 | $Gd_{14}Tb_{14}Co_{72}$ | 1800 |
| MEDIUM 7 | $Dy_{23}Fe_{72}Co_5$ | 500 | $Tb_{30}Co_{70}$ | 1500 |
| MEDIUM 8 | $Tb_{23}Fe_{72}Co_5$ | 500 | $Tb_{33}Co_{67}$ | 1500 |

When a magneto-optic recording apparatus using the other magneto-optic information recording media listed as embodiments of this invention in Table 1 was operated at a linear speed of 6 m/s, light-modulated direct overwriting was possible as in the first embodiment. Erasability characteristics of 20 dB or greater were obtained as shown in Table 2, and characteristics of 23 to 35 dB were obtained with optimum adjustment of the power.

TABLE 2

| | GENERATED FIELD (Oe) | PEAK POWER (mW) | BOTTOM POWER (mW) |
|---|---|---|---|
| MEDIUM 2 | 1000 ± 100 | 12.0 to 17.0 | 4.0 to 7.0 |
| MEDIUM 3 | 1200 ± 100 | 10.0 to 15.0 | 4.0 to 7.0 |
| MEDIUM 4 | 1300 ± 100 | 11.0 to 17.0 | 4.0 to 7.0 |
| MEDIUM 5 | 1000 ± 100 | 13.0 to 17.0 | 4.5 to 7.5 |
| MEDIUM 6 | 1200 ± 100 | 12.0 to 15.0 | 4.5 to 7.5 |
| MEDIUM 7 | 800 ± 100 | 9.0 to 17.0 | 3.5 to 7.5 |
| MEDIUM 8 | 1200 ± 100 | 12.0 to 17.0 | 4.0 to 8.0 |

Another novel magneto-optic recording medium has layers with the following composition and thickness.

| Embodiment 9: | |
|---|---|
| first magnetic alloy layer (thickness: 500 angstroms) | $Tb_{23}Fe_{67}Co_{10}$ |
| second magnetic alloy layer (thickness: 1500 angstroms) | $Gd_{12}Tb_{12}Co_{76}$ |

Good overwriting characteristics similar to those of embodiment 1 were obtained.

Embodiment 10

Substrate: 1.2 mm-thick plastic substrate
TbFeCo ternary first amorphous magnetic alloy layer:
  $Tb_{23.6}(Fe_{90}Co_{10})_{76.4}$
  Thickness: 500 angstroms
  Room-temperature coercivity: Approx. 10K oersteds
  Curie temperature: 180° C.
GdTbCo ternary second amorphous magnetic alloy layer:
  $(Gd_{50}Tb_{50})_{24}Co_{76}$
  Thickness: 1800 angstroms
  Room-temperature coercivity: Approx. 1K oersted
  Curie temperature: $\geq 300°$ C.
After being initialized once at 10,000 oersteds, the magneto-optic recording medium of embodiment 10 was successfully overwritten 1000 times or more at a disk speed of 6 m/s with the recording field held at 1000 oersteds. The writing power of the laser beam was modulated between 15 mW and 5 mW at rates of 1 MHz and 1.5 MHz.

Embodiments 11 to 15

Magneto-optic information recording media having first magnetic layers and second magnetic layers with the compositions listed in Table 3 but otherwise similar to embodiment 10 were obtained as further embodiments of this invention, and their overwritability by a single light beam was investigated as in embodiment 10.

Comparative examples 1 and 2

Magneto-optic information recording media having first magnetic layers and second magnetic layers with the compositions listed in Table 3 but otherwise similar to embodiment 10 were obtained as comparative examples, and their overwritability by a single light beam was investigated as in embodiment 10.

magnetic layer 26 can be magnetized in a fixed direction at room temperature.

Specific characteristics of the first magnetic layer 24, the second magnetic layer 25, and the third magnetic layer 26 will be described next.

The Curie temperatures Tc1, Tc2, and Tc3 of the layers satisfy the relationship:

$$Tc1 < Tc2 < Tc3$$

In this embodiment all three layers are TM-rich, so the following conditions must be satisfied at room temperature. At room temperature:

$$Hc1 - Hw1(2) > 0 \quad (1)$$

$$Hc3 - Hb - Hw3(2) > 0 \quad (3)$$

In the interval from room temperature to Tc1 there

TABLE 3

|  | 1ST MAGNETIC LAYER | | 2ND MAGNETIC LAYER | | |
| --- | --- | --- | --- | --- | --- |
|  | COMPOSITION | THICKNESS Å | COMPOSITION | THICKNESS Å | OVER-WRITABLE |
| MEDIUM 11 | $Tb_{23.6}(Fe_{90}Co_{10})_{76.4}$ | 500 | $(Gd_{65}Tb_{35})_{23.5}Co_{76.5}$ | 1800 | YES |
| MEDIUM 12 | $Tb_{22.4}(Fe_{90}Co_{10})_{77.6}$ | 400 | $(Gd_{70}Tb_{30})_{22.0}Co_{76.0}$ | 1800 | YES |
| MEDIUM 13 | $Tb_{24.0}(Fe_{95}Co_{5})_{76.0}$ | 500 | $Tb_{24.2}Co_{75.8}$ | 1500 | YES |
| COMPARATIVE EXAMPLE 1 | $Tb_{24.2}(Fe_{95}Co_{5})_{75.8}$ | 500 | $(Gd_{60}Tb_{40})_{15.0}Co_{85.0}$ | 1800 | NO |
| COMPARATIVE EXAMPLE 2 | $Tb_{25.1}(Fe_{90}Co_{10})_{74.9}$ | 500 | $(Gd_{56}Tb_{44})_{35.0}Co_{65.0}$ | 1800 | NO |
| MEDIUM 14 | $Tb_{27.3}(Fe_{90}Co_{10})_{72.7}$ | 400 | $(Gd_{60}Tb_{40})_{23.9}Co_{76.1}$ | 1500 | YES |
| MEDIUM 15 | $Tb_{23.6}(Fe_{50}Co_{50})_{76.4}$ | 400 | $(Gd_{50}Tb_{50})_{24.5}Co_{75.5}$ | 1800 | YES |

Next an overwritable magneto-optic recording medium requiring no initializing magnet and having a three-layer structure will be described.

Figure 6:
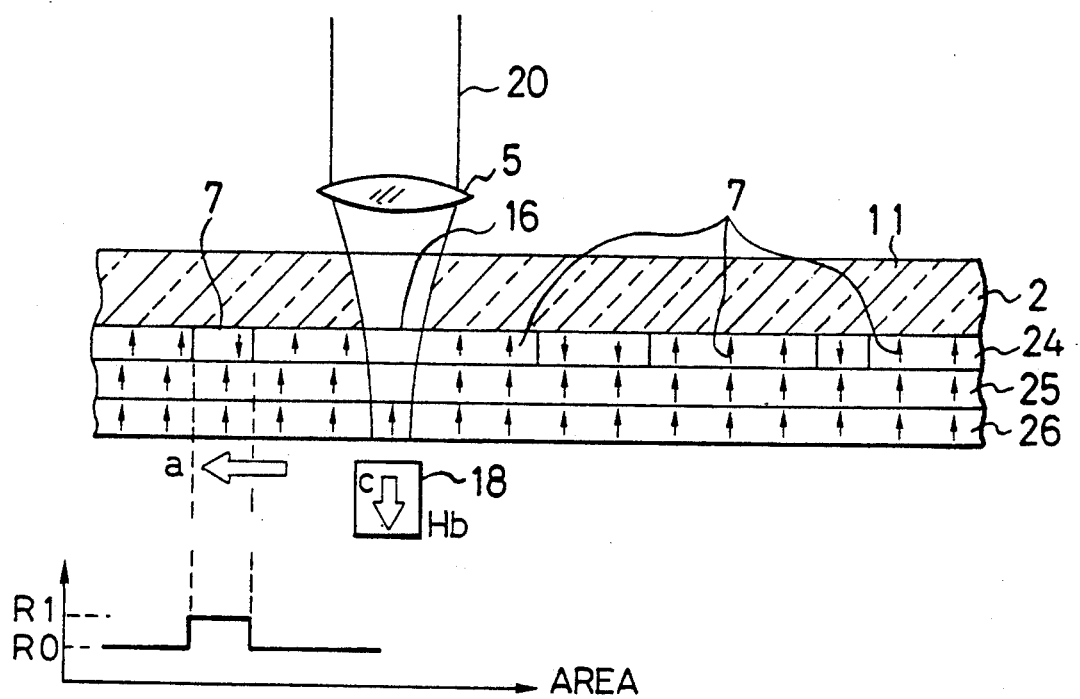
FIG. 6 (a) is a partial sectional view illustrating optical reading and writing of an inventive three-layer magneto-optic recording medium, and (b) is a plot of laser power variations for recording information in areas on the magneto-optic recording medium.

In FIG. 6, reference numerals identical to those in FIG. 1 denote elements similar to those in FIG. 1. The numeral 24 denotes a first magnetic layer, 25 denotes a second magnetic layer, and 26 denotes a third magnetic layer. In this embodiment, the first magnetic layer 24, the second magnetic layer 25, and the third magnetic layer 26 are all TM-RE alloys, and all layers are TM-rich. The first magnetic layer 24 and the second magnetic layer 25 are coupled by an exchange coupling force which aligns the direction of magnetization of the TM sublattices in the two layers. The second magnetic layer 25 and the third magnetic layer 26 are coupled by a similar exchange coupling force.

The magnetization of the third magnetic layer 26 is initialized to the up direction in the drawing by, for example, an electromagnet.

The first magnetic layer 24 is the recording layer which holds a sublattice magnetization (in this case the magnetization of the TM sublattice) representing the information "0" or "1." The second magnetic layer 25 and the third magnetic layer 26 are provided for the purpose of overwritability. The second magnetic layer 25 is particularly referred to as the auxiliary layer; its sublattice magnetization is transferred to the first magnetic layer 24. (That is, the sublattices of the first magnetic layer 24 are magnetically aligned with the sublattices of the second magnetic layer.) This enables the first magnetic layer 24 to be magnetized in the desired direction. The third magnetic layer 26 is an initializing layer. The sublattice magnetic alignments of the third magnetic layer 26 are transferred to the second magnetic layer 25, whereby the sublattices of the second exists a temperature at which the following condition is satisfied:

$$Hc2 + Hw2(1) - Hw2(3) < 0 \quad (2)$$

where,

Hci: coercivity of the i-th magnetic layer

Hwi(j): reversal field shift in i-th layer due to exchange coupling force between j-th layer and i-th layer Hb: field applied by the bias magnet 18 during writing Next the operation will be described. Reading is the same as in the prior art, so the description below pertains to overwriting.

As the recording medium passes through the beam spot, it undergoes the environmental changes shown in Table 4.

TABLE 4

|  | EXTERNAL FIELD | TEMPERATURE |
| --- | --- | --- |
| ENVIRONMENT I | 0 | ROOM TEMP. |
| ENVIRONMENT II | Hb | ROOM TEMP. |
| ENVIRONMENT III | Hb | ELEVATED TEMP. |
| ENVIRONMENT IV | Hb | ROOM TEMP. |
| ENVIRONMENT V | 0 | ROOM TEMP. |

Environment III obtains in the substantially 1-micrometer area of the beam spot 16. Environments II and IV obtain in the substantially 1-millimeter regions in front of and behind the beam spot. In environment III, the temperature of the magnetic layers in the beam spot 16 rises to a maximum temperature that depends on the laser intensity. Afterward, when the beam spot 16 has been passed, the temperature falls, returning to room temperature in a space of several tens of micrometers.

Overwriting is enabled by binary modulation of the above-mentioned laser intensity. Writing with the stronger laser intensity R1 will be referred to as high writing, and the maximum temperature reached by the magnetic layers at this time will be denoted Thigh. Writing with the weaker laser intensity R0 will be referred to as low writing, and the maximum temperature reached by the magnetic layers at this time will be denoted Tlow.

The processes of low writing and high writing will be described in detail with reference to the changes in magnetization in corresponding environments.

Low writing

Environment I: The first magnetic layer 24 has characteristics satisfying the above equation (1). Since the coercivity Hc1 is greater than the exchange coupling force Hw1(2) exerted by the second magnetic layer 25, the previous state of magnetization is preserved: the sublattices thus retain their up or down state according to the information written previously. As can be seen from equation (3), the coercivity Hc3 of the third magnetic layer 26 is sufficiently high that the pre-existing up-magnetization of its TM sublattice is retained. According to equation (2), the exchange coupling force between the second magnetic layer 25 and the third magnetic layer 26 is strong enough that the TM sublattice in the second magnetic layer 25 is magnetically aligned with the TM sublattice in the third magnetic layer 26; that is, it is magnetized in the up direction. There are accordingly two states in environment I: one in which "1" information is written in the first magnetic layer 24, which is the recording layer; and another in which the information "0" is written. If the upward state of magnetization of the TM sublattice in the first magnetic layer 24 is named the "1" state and the downward state is named the "0" state, the two states are as indicated at (1) in FIG. 7. In the drawings, ↑ indicates the magnetization of the TM sublattice, and ↑ indicates the magnetization of the RE sublattice, the length being proportional to the strength of magnetization. In all layers, ↑ is longer than ↑ because all magnetic layers in this embodiment are TM-rich. In the "1" state, the sublattices in the first magnetic layer 24 and the second magnetic layer 25 are magnetized in opposite directions, so their mutual states oppose the exchange coupling force; they are in an unstable state with an energy of σw12 at the interface between the two layers. This instability is represented by cross-hatching in the drawing. The first magnetic layer 24 and the second magnetic layer 25 are able to maintain this unstable state because they satisfy the conditions in equations (1) and (2), respectively.

Figure 7:
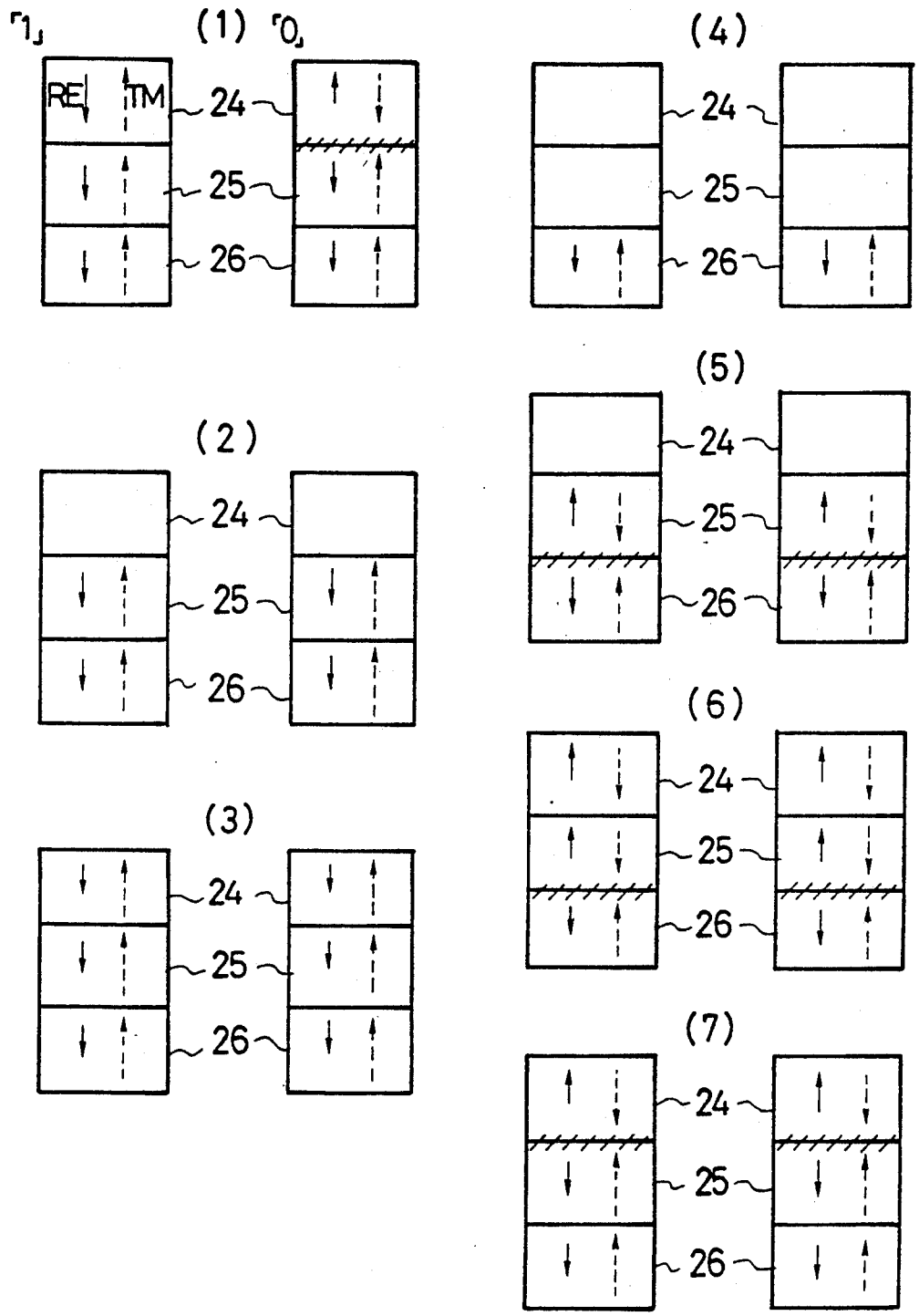
FIG. 7 shows the states of the layers of an inventive three-layer magneto-optic recording medium during the writing of information.

Environment II: The difference from environment I is that a downward-oriented external magnetic field Hb is applied by the bias magnet 18. At (1) in FIG. 7, a somewhat unstable state exists only in the first magnetic layer 24 in the "0" state. Since Hb points down, however, it acts to preserve the direction of magnetization of the first magnetic layer 24 in the "0" state. The other layers are in a sufficiently stable state that their magnetization is not reversed by the external magnetic field Hb which has a strength of at most a few hundred oersteds. The state at (1) in FIG. 7 is therefore maintained in environment II.

Environment III: The magnetic layers in the beam spot 16 illuminated with laser intensity R0 are heated to a maximum temperature of Tlow, which satisfies the relationship:

$$Tc1 \leq Tlow < Tc2 < Tc3$$

At this Tlow, the first magnetic layer 24 is demagnetized because it is at or above its Curie temperature Tc1. The Curie temperatures Tc2 and Tc3 of the second magnetic layer 25 and the third magnetic layer, however, are high enough that the state of magnetization in environment II is maintained. The magnetization state at this maximum temperature Tlow is accordingly as shown at (2) in FIG. 7. Upon leaving the beam spot 16, the magnetic layers rapidly cool. During the cooling process, at a point where the temperature of the first magnetic layer 24 has fallen a little below Tc1, spontaneous magnetization begins to appear in the first magnetic layer 24. The coercivity of the first magnetic layer 24 is sufficiently small at this temperature, and the exchange coupling force from the second magnetic layer 25, which has a sufficiently high Curie temperature, is comparatively large $[Hc1 = Hb < Hw1(2)]$, that the sublattices of the first magnetic layer 24 are magnetically aligned with the sublattices of the second magnetic layer 25. This state of magnetization is maintained when cooling proceeds and the magnetic layers return to room temperature. Thus at the point of return to room temperature, the state of magnetization is as shown at (3) in FIG. 7.

Environments IV and V: All magnetic layers in (3) in FIG. 7 are sufficiently stable that they remain in the same state in environment IV and environment V. Low writing therefore leaves the TM sublattice of the first magnetic layer magnetized in the "1" state, regardless of whether it was formerly in the upward-pointing "1" state or the downward-pointing "0" state.

High recording

Environments I and II are the same as environments I and II in low recording, at (1) in FIG. 7.

Environment III: The magnetic layers in the beam spot 16 illuminated by the laser intensity R1 are heated to a maximum temperature of Thigh, which satisfies the relationships:

$$Tc1 < Tc2 \leq Thigh < Tc3$$

At temperature Thigh, both the first magnetic layer 24 and the second magnetic layer 25 lose their magnetization. The Curie temperature of the third magnetic layer 26, however, is high enough that the state of magnetization in environment II is maintained. The magnetization states at this maximum temperature Thigh are therefore as shown at (4) in FIG. 7. When the magnetic layers leave the beam spot 16, they rapidly cool. During the cooling process, at a point at which the temperature of the second magnetic layer 25 is slightly less than Tc2, the second magnetic layer 25 begins to undergo spontaneous magnetization. At temperatures sufficiently higher than Tc1, the coercivity of the second magnetic layer 25 and the exchange coupling force exerted by the third magnetic layer 26 are small enough that the main factor at this temperature is the bias field Hb. The second magnetic layer 25 is thus magnetized in the down direction in alignment with the bias field, as shown at (5) in FIG. 7.

A state of instability therefore exists between the second magnetic layer 25 and the third magnetic layer 26, but the second magnetic layer 25 is supported by the relatively strong, downward-pointing force of the bias field [Hw2(3)−Hc2<Hb], and the Curie temperature Tc3 of the third magnetic layer 26 is sufficiently high that its coercivity remains high enough to hold the upward direction of magnetization [Hc3−Hb−Hw3(2)>0]. As the temperature falls, the coercivity of the second magnetic layer 25 and the third magnetic layer 26 increases and they become more stable. When the temperature falls slightly below Tc1, the first magnetic layer 24 begins to undergo spontaneous magnetization, so just as in low writing, the sublattices of the first magnetic layer 24 are magnetically aligned with the sublattices of the second magnetic layer 25. This magnetic alignment remains unchanged as cooling proceeds to room temperature [at (6) in FIG. 7].

Upon cooling to room temperature, the magnetic alignment of the sublattices of the third magnetic layer 26 is transferred to the second magnetic layer 25, which satisfies equation (2), as shown at (7) in FIG. 7, while the first magnetic layer 24, which satisfies equation (1), maintains its existing state of magnetization.

Environments IV and V: The first magnetic layer 24 and the second magnetic layer 25, which satisfy equations (1) and (2), continue to hold the states of magnetization shown in FIG. 7.

High recording therefore leaves the TM sublattice magnetization of the first magnetic layer in the "0" state, regardless of whether it was previously in the up-oriented "1" state or the down-oriented "0" state.

Given binary information can therefore be overwritten without difficulty by modulation of the laser intensity between the two values R0 and R1 as shown above.

The specific composition of the magnetic layers used is as follows.

First magnetic layer: $Tb_{21}Fe_{74}Co_5$
Second magnetic layer: $Dy_{19}Fe_{62}Co_{19}$
Third magnetic layer: $Tb_{20}Co_{80}$ Good overwriting with a C/N ratio of 45 dB was obtained by applying a downward-oriented magnetic field of 200 oersteds as the bias field.

Figure 8:
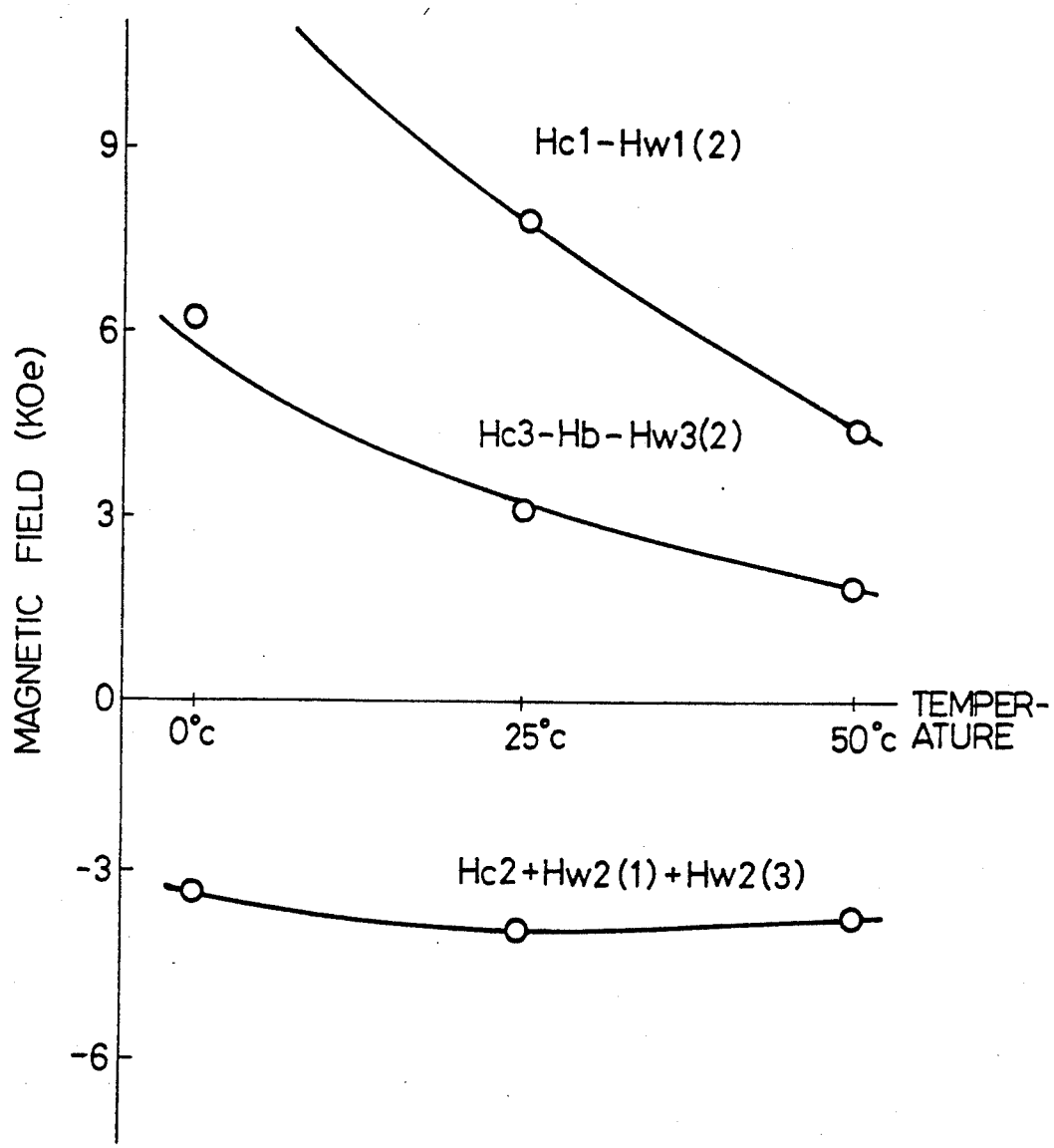
FIG. 8 is an illustrative drawing showing the possibility of overwriting in a room-temperature environment.

FIG. 8 shows the results (marked with circles) of measurements of the quantities on the left sides of equations (1) to (3) made in the vicinity of room temperature. These results indicate that overwriting is possible in the temperature range from 0° C. to 50° C.

In the embodiments shown above the first magnetic layer 24, the second magnetic layer 25, and the third magnetic layer 26 were all TM-rich, but other combinations are possible also. Table 5 lists examples for which overwriting has been confirmed. The direction of the bias field is for the case in which the third magnetic layer is magnetized in the up direction. In the column that indicates the type of each layer, the notation (RE) means that the RE sublattice is magnetically dominant at room temperature, but the TM sublattice is magnetically dominant at higher temperatures (above the compensation point).

The conditions that permit reading and writing on a three-layer overwritable recording medium like the one described above are summarized as follows. At room temperature:

$$\left.\begin{array}{l}\text{(a) } Hc1 - 0.5(ab + 1)Hb - Hw1(2) > 0 \\ \text{(b) } Hc3 + 0.5(ac - 1)Hb - Hw3(2) > 0 \\ \text{There must also exist, in the range of} \\ \text{temperatures up to Tc2, a temperature at} \\ \text{which the following condition is satisfied:} \\ \text{(c) } Hc2 + 0.5(-a - 1)Hb + Hw2(1) - Hw2(3) > 0\end{array}\right\} \quad (4)$$

where,
Hc1: coercivity of first magnetic layer
Hc2: coercivity of second magnetic layer
Hc3: coercivity of third magnetic layer
Hb: magnetic field applied during writing
Hwi(j): reversal field shift in i-th layer due to exchange coupling force between j-th layer and i-th layer
a=1: when the second layer has a compensation temperature at room temperature or higher
a=−1: when the second layer does not have a compensation temperature at room temperature or higher
b=1: when the first and second layers are both TM-rich, or both RE-rich
b=−1: in other cases
c=1: when the second and third layers are both TM-rich, or both RE-rich
c=−1: in other cases

TABLE 5

| | MAGNETIC LAYERS | | | COMPOSITIONS | | | | | PARAMETERS | | |
|---|---|---|---|---|---|---|---|---|---|---|---|
| NO. | 1st | 2nd | 3rd | 1st | 2nd | 3rd | Hb | C/N | a | b | c |
| 2 | TM | TM | (RE) | $Tb_{21}Fe_{74}Co_5$ | $Dy_{19}Fe_{60}Co_{21}$ | $Tb_{29}Co_{71}$ | +350 | 45 | −1 | 1 | −1 |
| 3 | TM | RE | TM | $Tb_{21}Fe_{74}Co_5$ | $Dy_{28}Fe_{50}Co_{22}$ | $Tb_{18}Co_{82}$ | +300 | 45 | −1 | −1 | −1 |
| 4 | TM | RE | (RE) | $Tb_{15}Dy_6Fe_{73}Co_6$ | $Dy_{28}Fe_{50}Co_{22}$ | $Tb_{29}Co_{71}$ | −250 | 44 | −1 | −1 | 1 |
| 5 | TM | (RE) | TM | $Tb_{21}Fe_{79}$ | $Gd_{13}Dy_{15}Fe_{57}Co_{15}$ | $Tb_{19}Co_{81}$ | −300 | 39 | 1 | −1 | −1 |
| 6 | TM | (RE) | RE | $Dy_{20}Fe_{70}Co_{10}$ | $Gd_{13}Dy_{15}Fe_{57}Co_{15}$ | $Tb_{30}Co_{70}$ | +350 | 46 | 1 | −1 | 1 |
| 7 | TM | (RE) | (RE) | $Tb_{21}Fe_{79}$ | $Dy_{26}Fe_{52}Co_{22}$ | $Tb_{29}Co_{71}$ | +400 | 41 | 1 | −1 | 1 |
| 8 | TM | (RE) | (RE) | $Tb_{21}Fe_{74}Co_5$ | $Gd_{17}Tb_9Fe_{67}Co_{10}$ | $Tb_{29}Co_{71}$ | +350 | 44 | 1 | −1 | 1 |
| 9 | (RE) | (RE) | (RE) | $Tb_{23}Fe_{73}Co_4$ | $Gd_{18}Dy_{10}Fe_{62}Co_{10}$ | $Tb_{29}Co_{71}$ | +350 | 43 | 1 | 1 | 1 |
| 10 | (RE) | (RE) | RE | $Dy_{21}Fe_{69}Co_7$ | $Gd_{13}Dy_{15}Fe_{57}Co_{15}$ | $Tb_{30}Co_{70}$ | +350 | 43 | 1 | 1 | 1 |

NOTES:
TM: TM-RICH
RE: RE-RICH
Hb: BIAS FIELD (Oe) + UP; −DOWN
C/N: CARRIER-TO-NOISE RATIO (dB)

Figure 9:
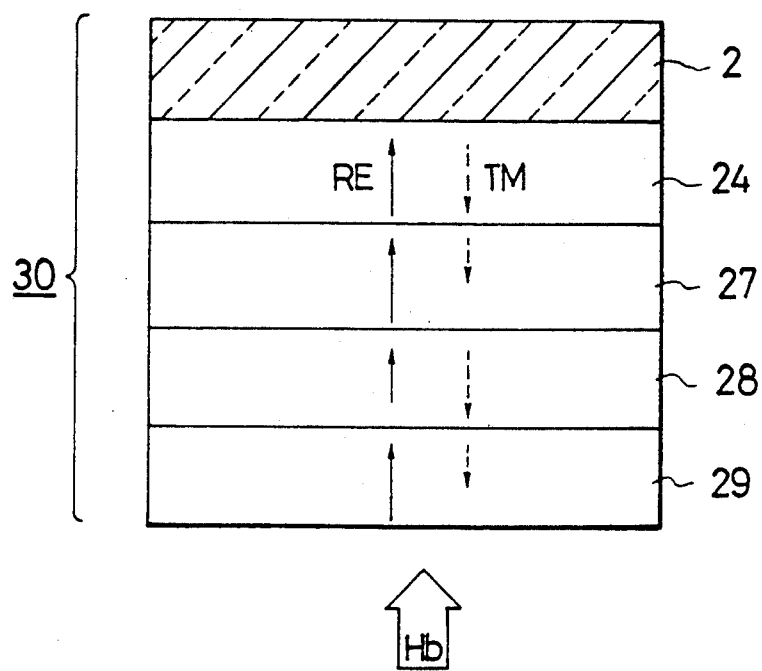
FIG. 9 is a drawing showing the specific structure of an inventive four-layer magneto-optic recording medium.
Figure 12:
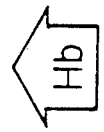
Figure 13:
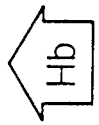
Figure 14:
Figure 16:
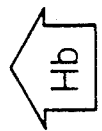
Figure 17:
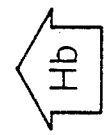
Figure 18:
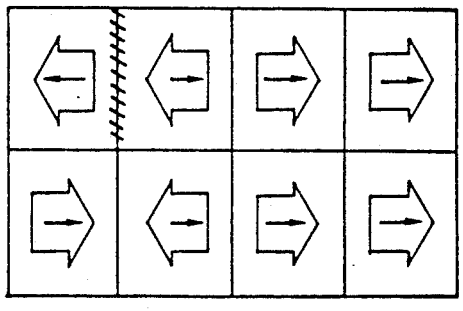
Figure 21:
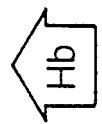
Figure 22:
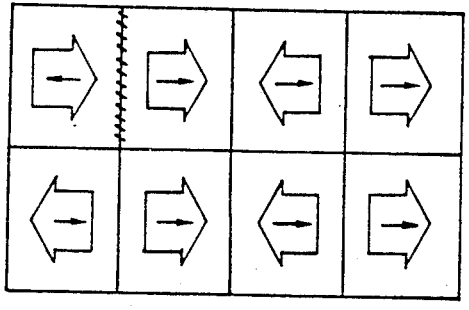
Figure 23:
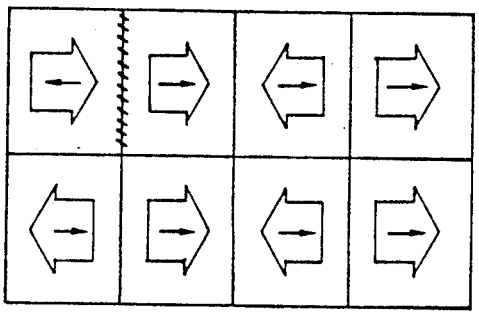
Figure 25:
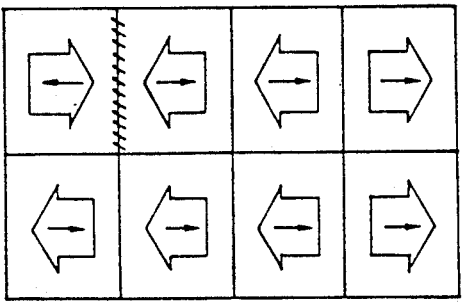
Figure 26:
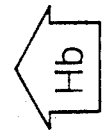
Figure 27:
Figure 28:
Figure 29:
Figure 30:
Figure 31:
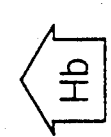
Figure 32:
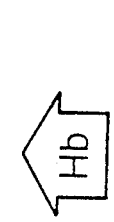
Figure 33:
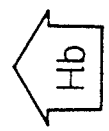
Figure 34:
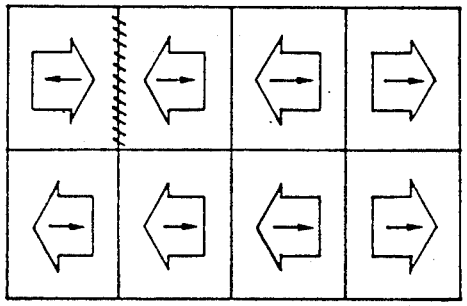
Figure 35:
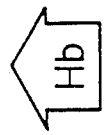
Figure 36:
Figure 37:
Figure 39:
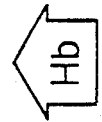
Figure 40:
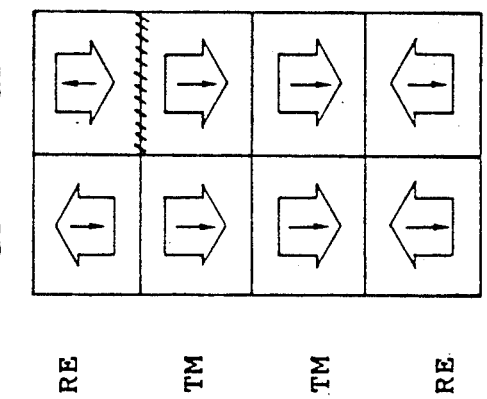
Figure 42:
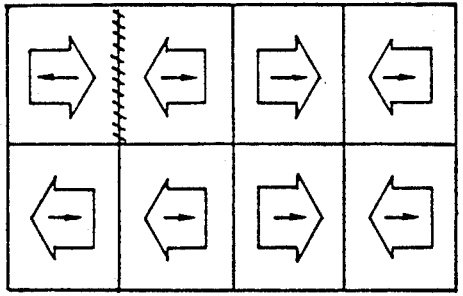
Figure 45:
Figure 48:
Figure 49:
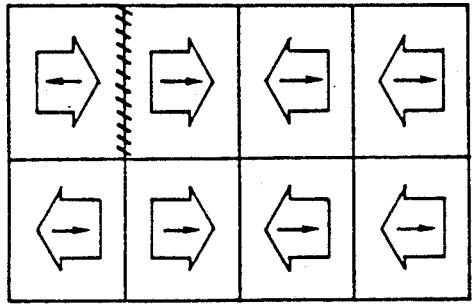
Figure 50:
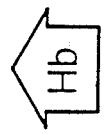
Figure 51:
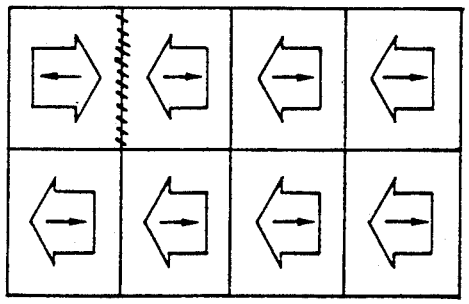
Figure 52:
Figure 54:
Figure 55:
Figure 56:
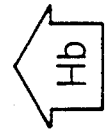
Figure 57:
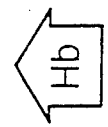
Figure 58:
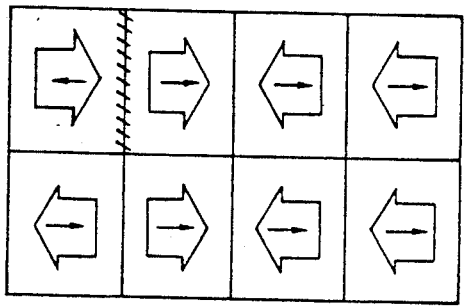
Figure 59:
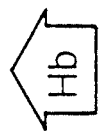
Figure 60:
Figure 61:
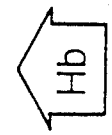
Figure 62:
Figure 63:
Figure 64:
Figure 65:
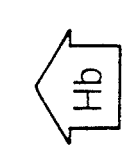
Figure 66:
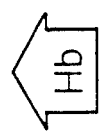
Figure 68:
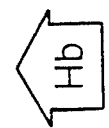
Figure 69:
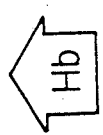
Figure 70:
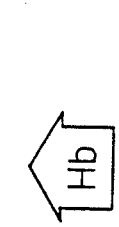
Figure 71:
Figure 72:
Figure 73:
Figure 75:
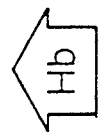
Figure 77:
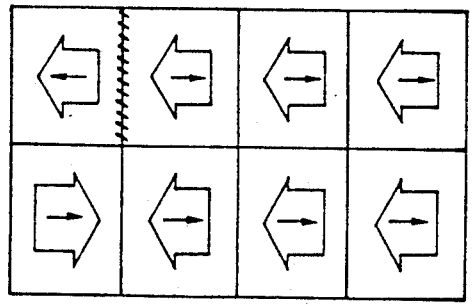
Figure 78:
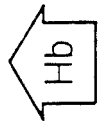
Figure 79:
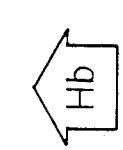
Figure 80:
Figure 81:
Figure 82:
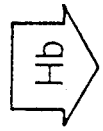
Figure 83:
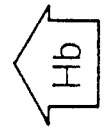
Figure 84:
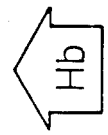
Figure 85:
Figure 86:
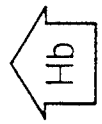
Figure 87:
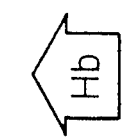
Figure 88:
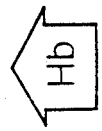
Figure 89:
Figure 90:

By providing one or more magnetic layers with lower Curie temperatures between the second magnetic layer and third magnetic layer of the above-described three-layer magneto-optic recording medium, reading and writing can be better stabilized and the C/N ratio can be improved. FIG. 9 shows a sectional view of the main parts of a magneto-optic recording medium according to this invention, in which 27, 28, and 29 denote a second magnetic layer, a third magnetic layer, and a fourth magnetic layer, respectively. The third magnetic layer is the newly added layer. The fourth magnetic layer corresponds to the third magnetic layer in a three-layer medium. The recording medium 30 is formed by a method such as sputtering on a glass substrate and has a ferrimagnetic structure such as the following:

| | | |
|---|---|---|
| 1st magnetic layer: | $Dy_{23}Fe_{68}Co_9$ | 500 angstroms |
| | [compensation composition (at room temperature)] | |
| 2nd magnetic layer: | $Tb_{25}Fe_{60}Co_{15}$ | 700 angstroms [RE-rich] |
| 3rd magnetic layer: | $Tb_{16}Fe_{84}$ | 200 angstroms [TM-rich] |
| 4th magnetic layer: | $Tb_{30}Co_{70}$ | 700 angstroms [RE-rich] |

Adjacent magnetic layers are coupled by an exchange force. The fourth magnetic layer 29 has a coercivity of 700 oersteds or greater at temperatures from room temperature up to substantially 300° C., and does not undergo magnetic reversal due to heating by laser illumination within the range of operating conditions. The second magnetic layer has a compensation temperature equal to or greater than room temperature. The external magnet 18 generates a magnetic field of 200 to 400 oersteds. The fourth magnetic layer 29 is initially uniformly magnetized in, for example, the up direction by a means such as exposing the recording medium 30 to a magnetic field exceeding the reversal field of the fourth magnetic layer 29. The external magnet 18 generates an upward-pointing field this time.

The temperature characteristics of the layers and the magnetic characteristics interrelating the layers are as follows:

$Tc4 > Tc2 > Tc1 > Tc3 >$ (room temperature)

$-Hw1(2) + Hc1 - Hb > 0$ (room temperature)

$Hw1(2) - Hc1 - Hb > 0$ (reference temperature: a temperature between room temperature and Tc1)

$Hw2(3) - Hw2(1) + Hc2 + Hb > 0$ (room temperature)

$Hw3(4) - Hw3(2) - Hc3 - Hb > 0$ (a certain temperature between Tc3 and room temperature)

$-Hw4(3) + Hc4 > 0$ (entire operating temperature range)

The operation will be explained next. In low writing, the laser output is increased over the read-out power. The area in the beam spot 6 exceeds the reference temperature but does not reach the magnetic reversal temperature of the second magnetic layer 27 (the temperature at which the coercivity becomes smaller than the external field, causing the magnetization to reverse itself to align with the external field), so the TM and RE sublattices of the second magnetic layer 27 do not change their directions of magnetization. At the reference temperature, the magnetic alignment of the second magnetic layer 57 is transferred to the first magnetic layer 24, causing the magnetic alignment of the TM sublattice of the first magnetic layer 24 to point downward as shown at (1) in FIG. 10. At the reference temperature, the first magnetic layer is TM-rich. The third magnetic layer 28 and the fourth magnetic layer 29 make no special contribution to this operation. Even if the third magnetic layer 28 loses its magnetization, it will be remagnetized in the same fixed direction by the exchange force coupling it with the fourth magnetic layer 29. After this, when the layers leave the beam spot and cool to the vicinity of room temperature, the first magnetic layer 24 returns to the compensation composition (FIG. 9).

In high writing, the temperature exceeds the magnetic reversal temperature of the second magnetic layer 27 but does not reach the magnetic reversal temperature of the fourth magnetic layer 29. The first and third magnetic layers lose their magnetization, but the magnetic alignments of the sublattices of the fourth magnetic layer 29 do not change. Since the temperature exceeds the compensation temperature of the second magnetic layer, the second magnetic layer becomes TM-rich. [(2) in FIG. 10] At its magnetic reversal temperature, the second magnetic layer 27 is not affected by exchange forces from the first and third magnetic layers, so it is upwardly magnetized in alignment with the field of the external magnet 18. [(3) in FIG. 10] In addition, the magnetic alignment of the second magnetic layer 27 is transferred to the first magnetic layer 24, so the first magnetic layer is also magnetized in the up direction. Since the exchange force is weakest between the first magnetic layer 24 and the second magnetic layer 27, stronger between the second magnetic layer 27 and the third magnetic layer 28, and strongest between the third magnetic layer 28 and the fourth magnetic layer 29, and since the third magnetic layer 28 is below its Curie temperature at this time, the sublattices of the third magnetic layer 28 align with the sublattices of the fourth magnetic layer 29 [(5) in FIG. 10]. When the temperature falls further and the exchange forces increase, the sublattices of the second magnetic layer 27 are magnetically aligned via the third magnetic layer 28 with the sublattices of the fourth magnetic layer 29, thus returning to their initial state. [(6) in FIG. 10]

In this way, light-modulated direct overwriting is possible by modulating only the laser intensity. On a magneto-optic recording medium comprising a substrate with grooves spaced at 1.6 micrometers, provided with a dielectric enhancement layer on which the above-described magnetic layers were formed and to which a magnetic field of 2000 oersteds had been applied, a C/N ratio of 45 dB and erasability characteristic of 40 dB or better were obtained at a linear speed of 11 m/s with a pit length of 0.76 micrometers. The laser beam was modulated between a peak power of 18 mW and a bottom power of 7 mW.

Embodiment 2

Recording media were formed by sputtering magnetic layers onto a glass substrate as in the preceding embodiment. Completely light-modulated direct overwriting is possible on any of these recording media by optimization of the writing conditions.

TABLE 6

| 1ST MAG. LAYER | 2ND MAG. LAYER | 3RD MAG. LAYER | 4TH MAG. LAYER |
|---|---|---|---|
| $Dy_{23}Fe_{68}Co_9$ 400 Å | $Tb_{25}Fe_{60}Co_{15}$ 700 Å | $Tb_{16}Fe_{84}$ 200 Å | $Tb_{30}Co_{70}$ 700 Å |
| $Dy_{23}Fe_{72}Co_5$ 500 Å | $Tb_{25}Fe_{60}Co_{15}$ 700 Å | $Tb_{16}Fe_{84}$ 200 Å | $Tb_{30}Co_{70}$ 700 Å |
| $Dy_{23}Fe_{68}Co_9$ 500 Å | $Tb_{25}Fe_{60}Co_{15}$ 700 Å | $Tb_{16}Fe_{84}$ 100 Å | $Gd_{10}Tb_{20}Co_{70}$ 1200 Å |

Figure 91:
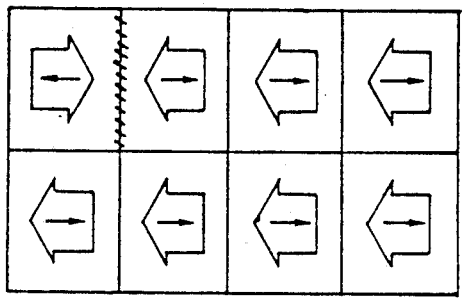

FIGS. 11 to 91 list all combinations of different types of layers, giving transition-metal and rare-earth-metal alloy compositions for each layer. The notation used in these drawings is defined below.

TM: a transition-metal-rich alloy of transition and rare-earth metals, not having a compensation temperature between room temperature and the Curie temperature RE: a rare-earth-rich alloy of transition and rare-earth metals, having a compensation temperature between room temperature and the Curie temperature re: a rare-earth-rich alloy of transition and rare-earth metals, not having a compensation temperature between room temperature and the Curie temperature t: thickness (angstroms)

Ms: saturation magnetic moment (emu/cc)

Hc: coercivity (oersteds)

Tc: Curie temperature (° C.)

Sw (or $\sigma_w$): interface magnetic barrier energy (erg/cm$^2$)

Hwi: total exchange force exerted on the i-th layer

Hwi(j): exchange force exerted on the i-th layer by the j-th layer [$\sigma_{wij}/(2|Msi|ti)$]
Both i and j are counted from the substrate side.

↑ : magnetic alignment of the TM sublattice
: net magnetization; sum of the TM sublattice magnetization and the RE sublattice magnetization Tstor: all temperatures within the storage temperature range (ex: $-10°$ C. to $60°$ C.)

Tread: all temperatures in the range form the lowest temperature during use to the temperature reached during read-out TL: a temperature higher than the reading temperature but lower than Tc1, at which transfer of the magnetic alignment of the second magnetic layer to the first magnetic layer occurs Tini: all temperatures under the temperature conditions during use (or the temperature at a certain location not illuminated by the laser beam, provided for initialization)

Tall: all temperatures in the operating temperature range (0° C. and above)

Tuse: the operating temperatures of the driving apparatus (0° C. to 50° C.)

In each drawing, a1 indicates the state in which "0" information is recorded, and a2 indicates the state in which "1" information is recorded. In the a2 state, cross-hatching indicates a magnetic wall.

Next the structure of another overwritable 3-layer magneto-optic recording medium will be described. The Curie temperatures of the layers and their magnetic properties are interrelated as follows.

$$Tc1 < Tc2 \quad [1]$$

$$Tc3 < Tc2 \quad [2]$$

$$Hc1 - Hw1(2) > 0 \text{ (room temperature)} \quad [3]$$

$$Hc2 + Hw2(1) - Hw2(3) < 0 \quad [4]$$

(at a certain temperature between room temperature and Tc3)

$$Hc3 - Hw3(2) > 0 \text{ (room temperature)} \quad [5]$$

Figure 92A:
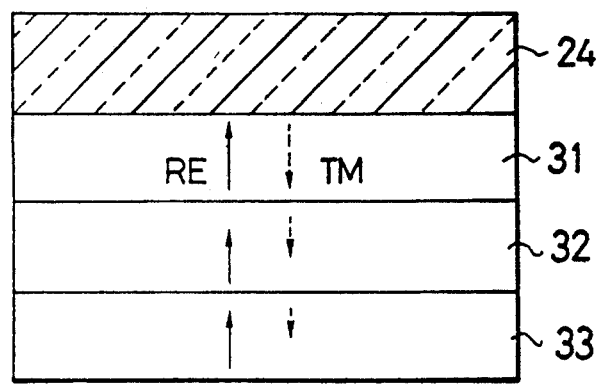
FIG. 92 (a) is a drawing showing the specific structure of another inventive three-layer magneto-optic recording medium, and (b) is an illustrative drawing showing the relationship of the temperature and saturation magnetization in the different layers.
Figure 92B:
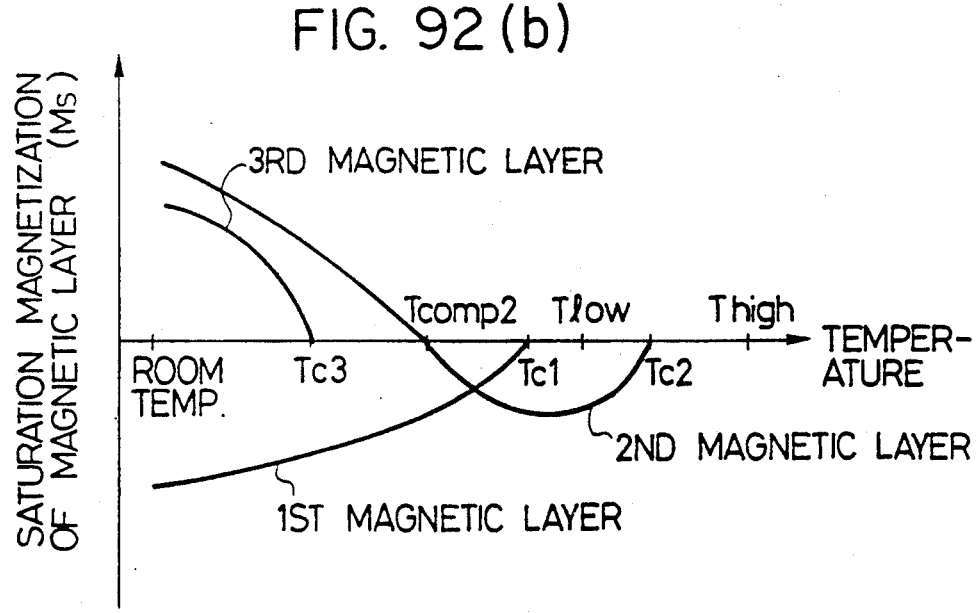

FIG. 92 (a) shows an embodiment of a three-layer magneto-optic recording medium having these relationships. In the drawing, 31 is a first magnetic layer of $Tb_{23}(Fe_{92}Co_8)_{77}$, 32 is a second magnetic layer of $Tb_{26}(Fe_{85}Co_{15})_{74}$, and 33 is a third magnetic layer of $Tb_{26}Fe_{74}$. The second magnetic layer 32 has a compensation point higher than room temperature as shown in FIG. 92 (b).

Next the overwriting operation will be described. The third magnetic layer 33 is uniformly magnetized ahead of time in the up direction, as can easily be done by using an electromagnet to generate a magnetic field of substantially 20,000 oersteds, for example. The third magnetic layer 33 which has thus been magnetized in the up direction may be heated by illumination by the beam spot to a temperature above its Curie temperature Tc3, and may lose its magnetization, but when it cools it will again be magnetized in the up direction by the effect of the bias magnetic field Hb. While cooling, it may also be affected by an exchange force Hw from the second magnetic layer 32, but since $$Hc3 + Hb > Hw3(2) \quad [6]$$

the third magnetic layer 33 retains its upward magnetization until it cools to room temperature. (Note that the Hc3 and Hw3 in equation [6] are not the room-temperature values given in equations [3] and [5], but values below a temperature at which the magnetization of the third magnetic layer becomes fixed during cooling; hence equation [6] is satisfied at all temperatures during cooling.) Thus the magnetic alignment of the third magnetic layer 33 is always upward, except when illuminated by the laser spot.

The exchange force Hw2(3) from the third magnetic layer 33, which is always magnetized in the up direction as shown above, and the bias magnetic field Hb act to align the magnetization of the second magnetic layer 32 in the up direction. From equation [5], these forces outweigh the exchange force Hw2(1) from the first magnetic layer 31 and the coercivity Hc2, which may try to align the magnetization of the second magnetic layer 32 in the down direction, so the second magnetic layer 32 is magnetized in the up direction. This is referred to as initialization of the second magnetic layer 32.

The above argument assumes that the bias magnetic field Hb acts on the recording medium at room temperature. This state is attained in parts of the recording medium that are disposed directly above the bias magnetic field but are not illuminated by the beam spot. In an actual read-write apparatus, the laser spot will be centered in the region influenced by the bias magnetic field Hb, so the second magnetic layer will be initialized immediately before and immediately after writing. For that reason, the second magnetic layer 32, like the third magnetic layer 33, will always be magnetized in the up direction, except where illuminated by the laser spot.

Next the writing of "1" information by magnetizing the first magnetic layer 31 in the up direction will be explained. The laser power at this time is R1, and the temperature in the beam spot rises to Thigh in FIG. 92.

A temperature is therefore attained that exceeds the Curie temperature Tc1 of the first magnetic layer 31, and is close to or higher than Tc2, the temperature at which the coercivity of the second magnetic layer 32 becomes less than Hb. The result is that the first magnetic layer 31 loses its magnetization in the beam spot [(1) in FIG. 93], and the up-oriented bias magnetic field Hb aligns the magnetization of the TM sublattice of the second magnetic layer 32, which is TM-rich because it is above its compensation temperature, in the up direction [(2) in FIG. 93]. When the temperature of the first magnetic layer 31 falls below the Curie temperature Tc1, the magnetic alignment of the second magnetic layer 32 is transferred by exchange force to the first magnetic layer 31, so the TM sublattice of the first magnetic layer 31 is magnetized in the up direction, corresponding to the information "1" [(3) in FIG. 93]. When the temperature falls further and goes below the Curie temperature Tc3, the net magnetization of the sublattices of the third magnetic layer is forced by the bias magnetic field Hb to the up direction (the RE sublattice being magnetized in the up direction). At this temperature the second magnetic layer is below its compensation temperature and is RE-rich, hence the net sublattice magnetization of the second magnetic layer is changed by the exchange force and bias magnetic field Hb to the up direction as explained before. [(4) in FIG. 93]

Next the writing of a "0" to orient the magnetization of the first magnetic layer 31 in the down direction will be explained. In this case, the laser power is R0, and the temperature in the beam spot rises to Tlow in FIG. 92. The temperature in the beam spot is thus close to the Curie temperature Tc1 of the first magnetic layer 31 and far below the Curie temperature Tc2 of the second magnetic layer 32. The first magnetic layer 31 therefore loses its magnetization, or becomes unstable. When cooling begins, the sublattice magnetic alignments of the second magnetic layer 32 are transferred to the first magnetic layer, causing the magnetization of the TM sublattice of the first magnetic layer 31 to be directed downward, corresponding to "0" information as at (5) in FIG. 93. Further cooling proceeds as explained in the writing of a "1", leading to the state at (6) in FIG. 93. The operations described above enable new data to be overwritten on old in real time just by modulating the laser power according to the binary "0" and "1" values.

Favorable overwriting is also possible if a fourth magnetic layer is provided between the second magnetic layer 32 and the third magnetic layer 33 of the three-layer magneto-optic recording medium described above. In this case, the Curie temperature Tc4 of the fourth magnetic layer must be lower than the Curie temperature of the third magnetic layer. $Dy_{23}Fe_{77}$ (t=500 angstroms), for example, can advantageously be used as the fourth layer.

At room temperature, this magneto-optic medium satisfies the following conditions:

$$Hc1 > Hw1(2)  \quad [1]$$

$$Hc3 > Hw3(4) \quad [2]$$

There is furthermore a temperature between room temperature and Tc4 at which the following conditions are satisfied:

$$Hc2 < Hw3(4) - Hw2(1) \quad [3]$$

$$Hc4 < Hw4(3) - Hw4(2) \quad [4]$$

The addition of this fourth magnetic layer facilitates magnetization of the third magnetic layer by the bias magnetic field when the third magnetic layer cools. The reason is that when the third magnetic layer is magnetized by the bias magnetic field, the exchange force exerted by the second magnetic layer opposes the bias field. The temperature Td at which the magnetization of the third magnetic layer becomes fixed is slightly lower than Tc3. If the fourth magnetic layer has a Curie temperature satisfying the condition $$Tc3 > Td > Tc4,$$

then at the temperature Td at which the magnetization of the third layer is fixed, the fourth magnetic layer is not magnetized, so the exchange force from the second magnetic layer does not act on the third magnetic layer, hence the third magnetic layer can more easily align itself with the bias magnetic field.

After that, the sublattice magnetic alignments of the third magnetic layer are, by equation [4], transferred to the fourth magnetic layer, and the sublattice alignments of the fourth magnetic layer are, by equation [3], transferred to the second layer. Thus the second magnetic layer is initialized as described earlier.

The specific overwriting procedure is exactly the same as described earlier.

In all of the preceding embodiments it is important to control the exchange forces between the magnetic layers. For this purpose, interface control layers may be inserted between the magnetic layers. For example, in a two-layer medium, ferrimagnetic layers of the following compositions were sputtered onto a glass substrate, in the following order.

| 1st magnetic layer: | $Tb_{23}Fe_{72}Co_5$ | 500 angstroms |
| Interface control layer: | $Tb_{26}Fe_{70}Co_4$ | 50 angstroms |
| 2nd magnetic layer: | $Tb_{30}Fe_{70}$ | 1500 angstroms |

The interface control layer was formed by increasing the argon gas pressure by a factor of about six in the sputtering process. This medium showed good overwriting characteristics at a linear speed of 6 m/s with a peak power of 9 mW to 17 mW, a bottom power of 4 mW to 7.5 mW, and a bias field of 300±80 oersteds.

In a medium with four magnetic layers, the following ferrimagnetic layers and dielectric layer were formed by sputtering on a glass substrate:

| 1st magnetic layer: | $Dy_{23}Fe_{68}Co_9$ | 500 angstroms |
| Interface control layer: | $SiN_x$ | 10 angstroms |
| 2nd magnetic layer: | $Gd_{13}Dy_{12}Fe_{60}Co_{15}$ | 1200 angstroms |
| 3rd magnetic layer: | $Tb_{16}Fe_{84}$ | 200 angstroms |
| 4th magnetic layer: | $Tb_{30}Co_{70}$ | 700 angstroms |

Adjacent magnetic layers, including the layers separated by the interface control layer, are coupled by exchange forces as before. This medium showed good overwriting characteristics at a linear speed of 11 m/s with a bias magnetic field of 200 oersteds, when the laser power was modulated between a peak power of 18 mW and bottom power of 7 mW.

The following, which include the above, can be used as the interface control layer.

1. The interface control layer can be formed by increasing the pressure of the gas used in the sputtering of the normal magnetic layers by a factor of five or more.
2. A dielectric comprising a nitride such as SiN or AlN, or an oxide such as $SiO_x$ can be used.
3. The normal magnetic layers can be formed by neutral sputtering using only argon. An interface control layer can be formed by reactive sputtering with admixture of a reactive gas such as oxygen or nitrogen.
4. A rare-earth (RE)-transition-metal (TM) layer in which the RE component is 30 at % or greater can be formed under the normal sputtering gas pressure.
5. A non-magnetic metal such as Al or Cu can be used.
6. A magnetic layer with an axis of easy magnetization oriented in the plane of the disk can be used.

An interface control layer can be formed by methods such as the above, but methods other than the methods shown here can also be used as long as they permit control of the exchange coupling force.

Interface control layers that to not contribute to the essential operation can be added to a two-layer, three-layer, or four-layer medium, between any of the magnetic layers.

Figure 94:
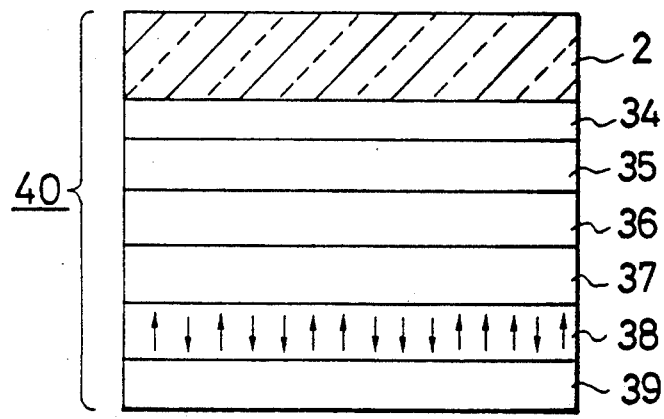
FIG. 94 is a drawing showing the specific structure of an inventive four-layer magneto-optic recording medium before initialization.

Magneto-optic recording media that are overwritable even without an initializing magnet have been described above. Next, methods of manufacturing such recording media will be described, taking a four-layer recording medium as an example. With reference to FIG. 94, after a layer of $SiN_x$ is sputtered onto a polycarbonate substrate 2 with a diameter of 130 mm as a dielectric layer 34, a first layer 35, a second layer 36, a third layer 37, and a fourth layer 38 are formed by sputtering in the same way, and finally a protective layer 39 is formed.

In this case, the magnetic domains of the fourth layer 38, which is the initializing layer, are left with random alignments.

Figure 95A:
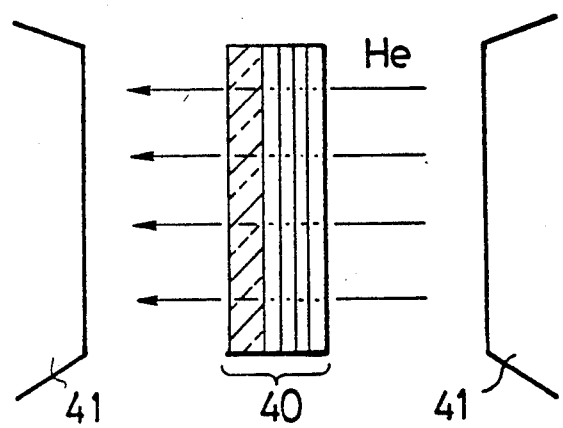
FIG. 95 (a) illustrates a method of initialization, and (b) shows the structure after the initialized layers are joined.
Figure 95B:
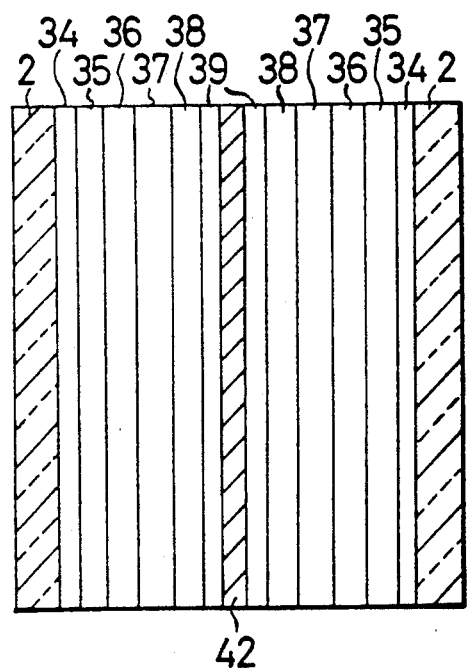

It is therefore necessary to align the magnetization of the fourth layer 38 in one direction. A first method can be considered as illustrated at (a) and (b) in FIG. 95. In the drawing, 41 is a initial magnetic field applying means, and 42 is an adhesive layer.

Before joining of the halves, a magnetic field He exceeding the room-temperature coercivity Hc4 of the fourth layer 38 is applied to align the magnetization of the fourth layer 38. Then an adhesive layer is formed comprising an epoxy or hot-melt adhesive or the like and the halves are joined.

As a second method, the coercivities Hc4(A) and Hc4(B) of the two fourth layers (on the pair of substrates that will be joined together) are arranged so that $|He(A)| > |Hc4(A)| > |He(B)| > |Hc4(B)|$, where He(A) and He(B) are magnetic fields applied by an initial magnetic field applying means.

Figure 96A:
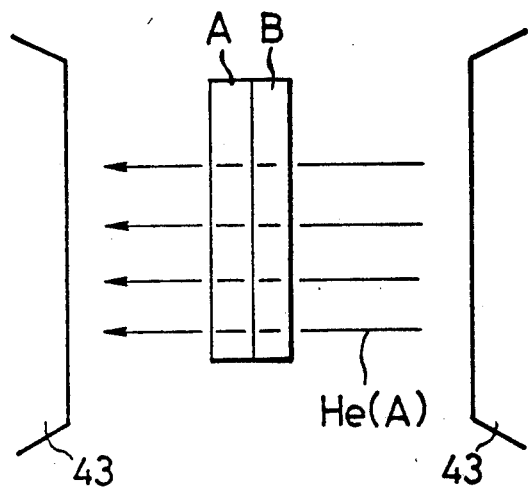
FIG. 96 illustrates another method of initialization.
Figure 96B:
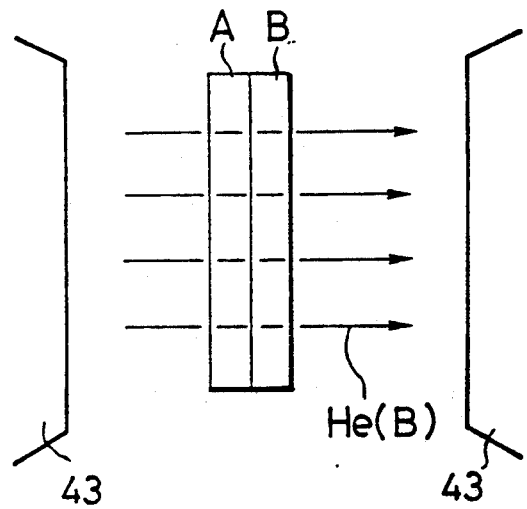
Figure 97A:
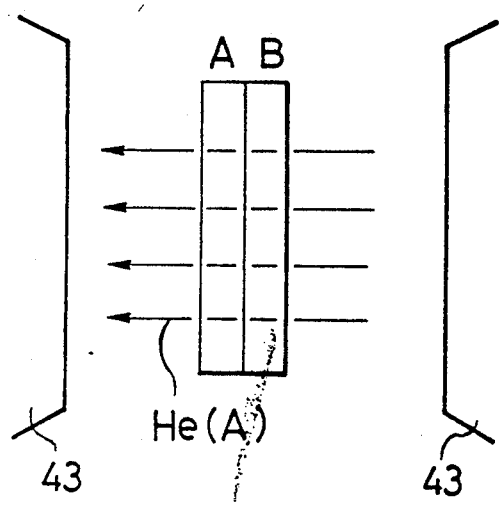
FIG. 97 illustrates yet another method of initialization.
Figure 97B:
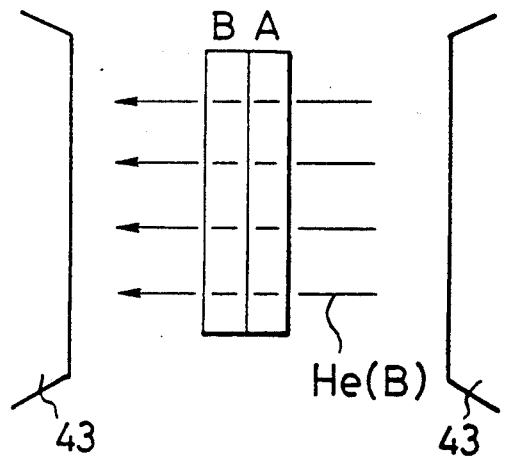
Figure 98:
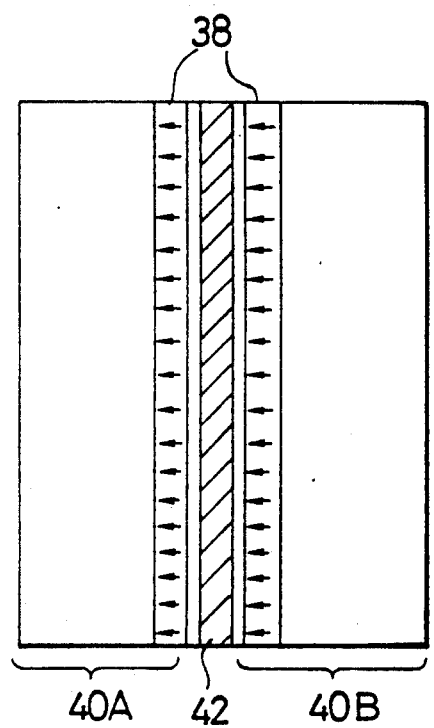
FIG. 98 shows the specific structure of a magneto-optic disk medium initialized as in FIG. 97.
Figure 100:
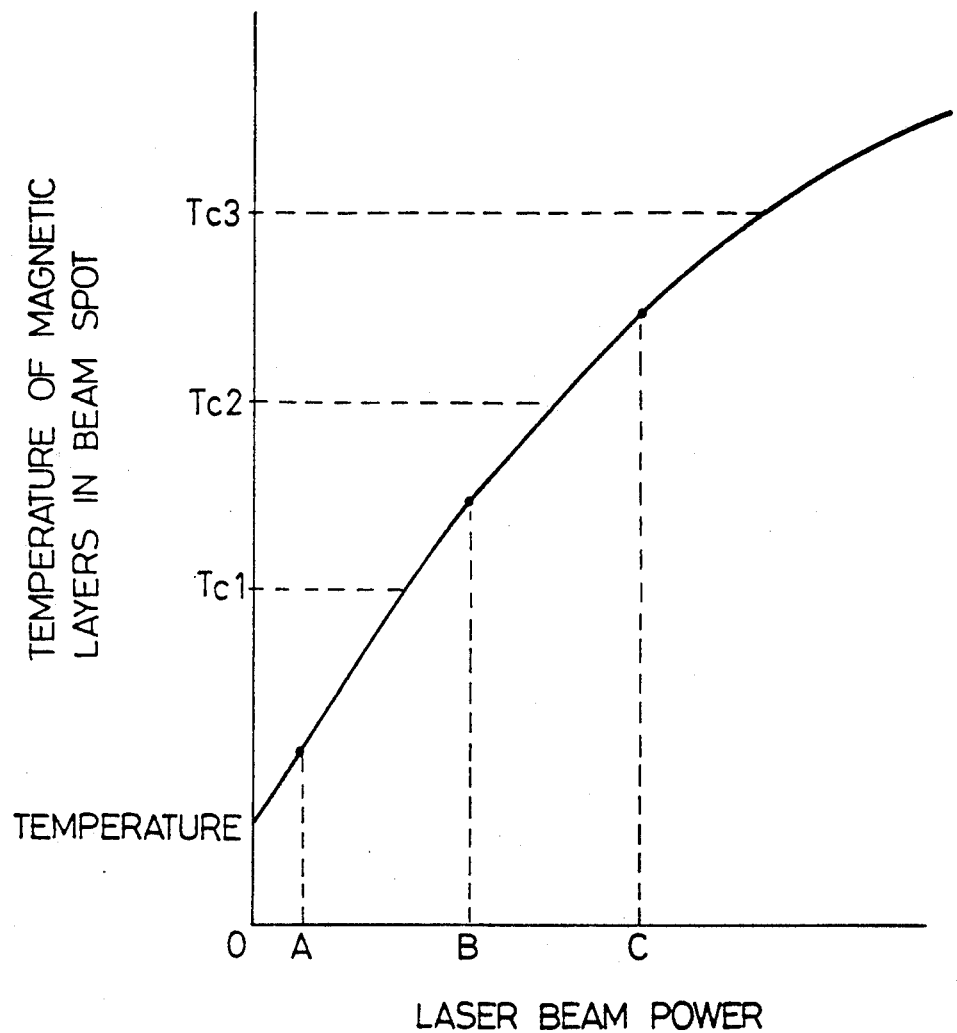
FIG. 100 is a plot of temperature of magnetic layers at beam spots for specified levels of laser beam power.

After such a pair of substrates has been joined together, first the magnetic field applying means 43 applies a magnetic field He(A) exceeding the Hc4(A) of the A-side of the disk to align the magnetization of the A-side initializing layer, as in (a) in FIG. 96. Next a magnetic field He(B) that exceeds Hc4(B) but does not exceed Hc4(A) and is oriented oppositely to He(A) is applied as at (b) in FIG. 96 to align the magnetization of the initializing layer on the B-side. This method of initializing the media can also be carried out by reversing the disk during the process, as illustrated at (a) and (b) in FIG. 97. FIG. 98 shows the assembled disk that has been initialized at (a) in FIG. 97. It is also possible for a device to detect the A- and B-sides of an assembled disk in which the fourth layers on the two sides 40A and 40B are initialized in the same direction, to change the orientation of the bias magnetic field, and to perform the final signal processing by taking account of the fact that the orientation of the bit cells is changed.

The preceding manufacturing methods have been described for a four-layer recording medium, but similar methods can be applied to three-layer and two-layer recording media.

Industrial Applicability

The magneto-optic recording media and manufacturing methods of this invention can be widely applied to enable high-density, high-speed recording of audio information, visual information, and computer data.

We claim:

1. In a method of manufacturing an overwritable magneto-optic recording medium having two halves, each half having a substrate and having a corresponding initializing layer, the initializing layers each having a magnetization which is not reversed in reading or writing, the steps of:

adhering the halves of the recording medium each to the other to form a joined recording medium;

applying a first magnetic field stronger than the coercivity of the initializing layers substantially perpendicular to the joined recording medium;

applying a second magnetic field weaker than the coercivity of one of the initializing layers but stronger than the coercivity of the other initializing layer and oriented oppositely to the first magnetic field substantially perpendicular to the joined recording medium, after applying the first magnetic field.

* * * * *

UNITED STATES PATENT AND TRADEMARK OFFICE
CERTIFICATE OF CORRECTION

PATENT NO. : 5,216,663
DATED : June 1, 1993
INVENTOR(S) : Kazuhiko Tsutsumi, Tatsuya Fukami, Motohisa Taguchi, et al It is certified that error appears in the above-identified patent and that said Letters Patent is hereby corrected as shown below:

On the title page, Item
[30] Foreign Application Priority Data the numbers are listed incorrectly and should be listed as follows:

Aug. 24, 1988 [JP] Japan     63-210205
May 12, 1989 [JP] Japan      1-119244
Jun 15, 1989 [JP] Japan      1-154918
Jul 10, 1989 [JP] Japan      1-175591

Signed and Sealed this

Twenty-seventh Day of September, 1994

Attest:

BRUCE LEHMAN

*Attesting Officer*          *Commissioner of Patents and Trademarks*